US012597318B2

(12) United States Patent
Visser et al.

(10) Patent No.: US 12,597,318 B2
(45) Date of Patent: Apr. 7, 2026

(54) SYSTEMS AND METHODS FOR ELECTRONIC GAMING WITH CHANGING DISPLAY STATES

(71) Applicant: Aristocrat Technologies Australia Pty Limited, North Ryde (AU)

(72) Inventors: Antoon Visser, Coogee (AU); Karen Kendall, Toongabbie (AU); Amy Batsiokis, Ryde (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 419 days.

(21) Appl. No.: 17/934,973

(22) Filed: Sep. 23, 2022

(65) Prior Publication Data

US 2023/0101866 A1 Mar. 30, 2023

(30) Foreign Application Priority Data

Sep. 27, 2021 (AU) ................................ 2021240123

(51) Int. Cl.
*G07F 17/32* (2006.01)
*G06F 7/58* (2006.01)

(52) U.S. Cl.
CPC .......... *G07F 17/3267* (2013.01); *G06F 7/588* (2013.01); *G07F 17/3213* (2013.01); *G07F 17/3244* (2013.01)

(58) Field of Classification Search
CPC ............. G07F 17/3213; G07F 17/3267; G07F 17/3258; G07F 17/3244
See application file for complete search history.

(56) References Cited

U.S. PATENT DOCUMENTS

| | | | | |
|---|---|---|---|---|
| 6,186,894 B1 * | 2/2001 | Mayeroff | ................ | G07F 17/34 |
| | | | | 463/16 |
| 10,957,147 B1 * | 3/2021 | Knight | ................ | G07F 17/3213 |
| 11,257,327 B1 * | 2/2022 | Sanborn | .............. | G07F 17/3213 |
| 2005/0159208 A1 * | 7/2005 | Pacey | ................. | G07F 17/3211 |
| | | | | 463/20 |
| 2012/0122547 A1 * | 5/2012 | Aoki | ....................... | G07F 17/34 |
| | | | | 463/20 |
| 2012/0172107 A1 * | 7/2012 | Acres | ...................... | G07F 17/34 |
| | | | | 463/16 |
| 2018/0061174 A1 * | 3/2018 | Boese | ................. | G07F 17/3244 |
| 2020/0250923 A1 * | 8/2020 | Ceniceroz | ........... | G07F 17/3218 |
| 2023/0401931 A1 * | 12/2023 | Milosevich | ......... | G07F 17/3267 |

* cited by examiner

*Primary Examiner* — Justin L Myhr
(74) *Attorney, Agent, or Firm* — ARMSTRONG TEASDALE LLP

(57) ABSTRACT

An electronic gaming device includes a processor configured to determine a symbol position state of a plurality of symbol position states wherein each symbol position state corresponds to a number of symbol positions and based upon the symbol position state, determine a paytable of a plurality of paytables. The processor is also configured to receive a random number generator (RNG) output and based upon the RNG output and the paytable, control display of a plurality of symbols. The processor is further configured to determine that the plurality of symbols includes at least one modifier symbol and based upon the at least one modifier symbol, determine a different symbol position state and a different paytable for a next play of the electronic game wherein the different symbol position state includes at least one more symbol position than the number of symbol positions.

20 Claims, 30 Drawing Sheets

300

341   342   343   344   345

| | Reel Strip 1 | Reel Strip 2 | Reel Strip 3 | Reel Strip 4 | Reel Strip 5 |
|---|---|---|---|---|---|
| 301 | A | PIC3 | PIC3 | A | PIC1 |
| 302 | Q | J | DYNAMIC | PIC2 | SCAT |
| 303 | PIC3 | Q | 9 | PIC3 | A |
| 304 | PIC2 | DYNAMIC | PIC2 | 9 | Q |
| 305 | K | A | PIC1 | Q | A |
| 306 | 9 | PIC1 | 10 | A | PIC3 |
| 307 | Q | PIC1 | K | A | Q |
| 308 | A | J | WILD | 10 | WILD |
| 309 | J | Q | J | K | K |
| 310 | 9 | Q | COR | K | 9 |
| 311 | A | 9 | Q | PIC1 | SCAT |
| 312 | PIC3 | K | PIC3 | SCAT | 10 |
| 313 | 10 | 10 | SCAT | A | K |
| 314 | SCAT | SCAT | Q | DYNAMIC | Q |
| 315 | K | WILD | Q | J | A |
| 316 | PIC1 | J | 10 | A | PIC3 |
| 317 | J | 9 | A | PIC3 | K |
| 318 | Q | A | SCAT | 9 | A |
| 319 | PIC3 | PIC2 | K | 9 | J |
| 320 | A | PIC3 | K | PIC2 | K |
| 321 | PIC1 | 9 | DYNAMIC | PIC1 | PIC3 |
| 322 | A | 10 | A | WILD | 10 |
| 323 | J | SCAT | K | PIC3 | J |
| 324 | 9 | PIC3 | PIC3 | Q | Q |
| 325 | PIC2 | Q | 9 | A | PIC3 |
| 330 | ... | ... | ... | ... | ... |

SYSTEMS AND METHODS FOR ELECTRONIC GAMING WITH CHANGING DISPLAY STATES

CROSS REFERENCE TO RELATED APPLICATIONS

This application claims the benefit of priority to Australian Patent Application No. 2021240123, filed Sep. 27, 2021, all of which is incorporated herein by reference.

FIELD

The present application relates to electronic gaming, and more specifically to systems and methods for electronic gaming with changing display states.

BRIEF SUMMARY

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming device is described. The electronic gaming device includes a processor and a memory device. The memory device includes instructions stored thereon which, when executed by the processor, cause the processor to, for a play of an electronic game, determine a symbol position state of a plurality of symbol position states stored in the memory device wherein each symbol position state corresponds to a number of symbol positions in at least one column of a plurality of columns and based upon the symbol position state, determine a paytable of a plurality of paytables stored in the memory device. The instructions also cause the processor to receive a random number generator (RNG) output from an RNG and based upon the RNG output and the paytable, control display of a plurality of symbols at the number of symbols positions. The instructions further cause the processor to determine that the plurality of symbols includes at least one modifier symbol and based upon the at least one modifier symbol, determine a different symbol position state of the plurality of symbol position states and a different paytable of the plurality of paytables for a next play of the electronic game wherein the different symbol position state includes at least one more symbol position than the number of symbol positions.

In another aspect, an electronic gaming system is described. The electronic gaming system includes a processor and a memory device with instructions stored thereon that, in response to execution by the processor, cause the processor to, for a play of an electronic game, identify a symbol position state of a plurality of symbol position states stored in the memory device wherein each symbol position state is associated with a number of symbol positions in at least one column of a plurality of columns and in response to identifying the symbol position state, identify a paytable of a plurality of paytables stored in the memory device wherein the paytable is associated with the symbol position state. The instructions also cause the processor to prompt a random number generator (RNG) output from an RNG and in response to the RNG output and identifying the paytable, identify a plurality of symbols for the number of symbols positions. The instructions further cause the processor to determine that the plurality of symbols includes at least one modifier symbol and in response to determining that the plurality of symbols includes the at least one modifier symbol, identify a different symbol position state of the plurality of symbol position states and a different paytable of the plurality of paytables for a next play of the electronic game wherein the different symbol position state includes at least one additional symbol position than the number of symbol positions associated with the symbol position state.

In yet another aspect, a non-transitory computer-readable storage medium is described. The non-transitory computer-readable storage medium includes instructions stored thereon that, in response to execution by a processor, cause the processor to, for a play of an electronic game, select a symbol position state of a plurality of symbol position states wherein each symbol position state is associated with a number of symbol positions in at least one column of a plurality of columns and in response to selecting the symbol position state, select a paytable of a plurality of paytables, wherein the paytable is associated with the symbol position state. The instructions also cause the processor to receive a random number generator (RNG) output from an RNG and in response to the RNG output and selecting the paytable, select a plurality of symbols for the number of symbols positions. The instructions further cause the processor to determine that the plurality of symbols includes at least one modifier symbol and in response to determining that the plurality of symbols includes the at least one modifier symbol, select a different symbol position state of the plurality of symbol position states and a different paytable of the plurality of paytables for a next play of the electronic game wherein the different symbol position state includes at least one additional symbol position than the number of symbol positions associated with the symbol position state.

BRIEF DESCRIPTION OF THE DRAWINGS

FIG. 3 illustrates an example reel strip layout.

DETAILED DESCRIPTION

In electronic gaming, many technical challenges arise when creating a new electronic game. For example, with respect to the systems and methods described herein, management of display real estate while also communicating information to players regarding the new game presents challenges. Further, tracking which symbol positions are active (e.g., how "expanded" each column of a plurality of columns is) and utilizing certain specific paytables based upon which symbol positions (e.g., and/or games) are active presents other challenges.

Accordingly, the systems and methods provided herein include technical solutions and improvements over known systems regarding at least: a) managing display real estate to communicate information regarding the electronic game (e.g., which column(s) will be expanded, which game is active (e.g., base game, free spins, "Stampede" feature, which bonuses are being provided or are available to be provided, etc.)); b) increasing a number of ways to win during play of the electronic game (e.g., by providing additional symbol positions with more symbols to be evaluated provided thereon) in order to provide more variety/flexibility in game outcomes; c) configuring different paytables for each symbol position state such that different paytables may be utilized based upon which symbol positions are active; and d) communicating, in limited display space and via display of indicators associated with input amounts, which input amounts are associated with which symbol position states.

Figure 1:
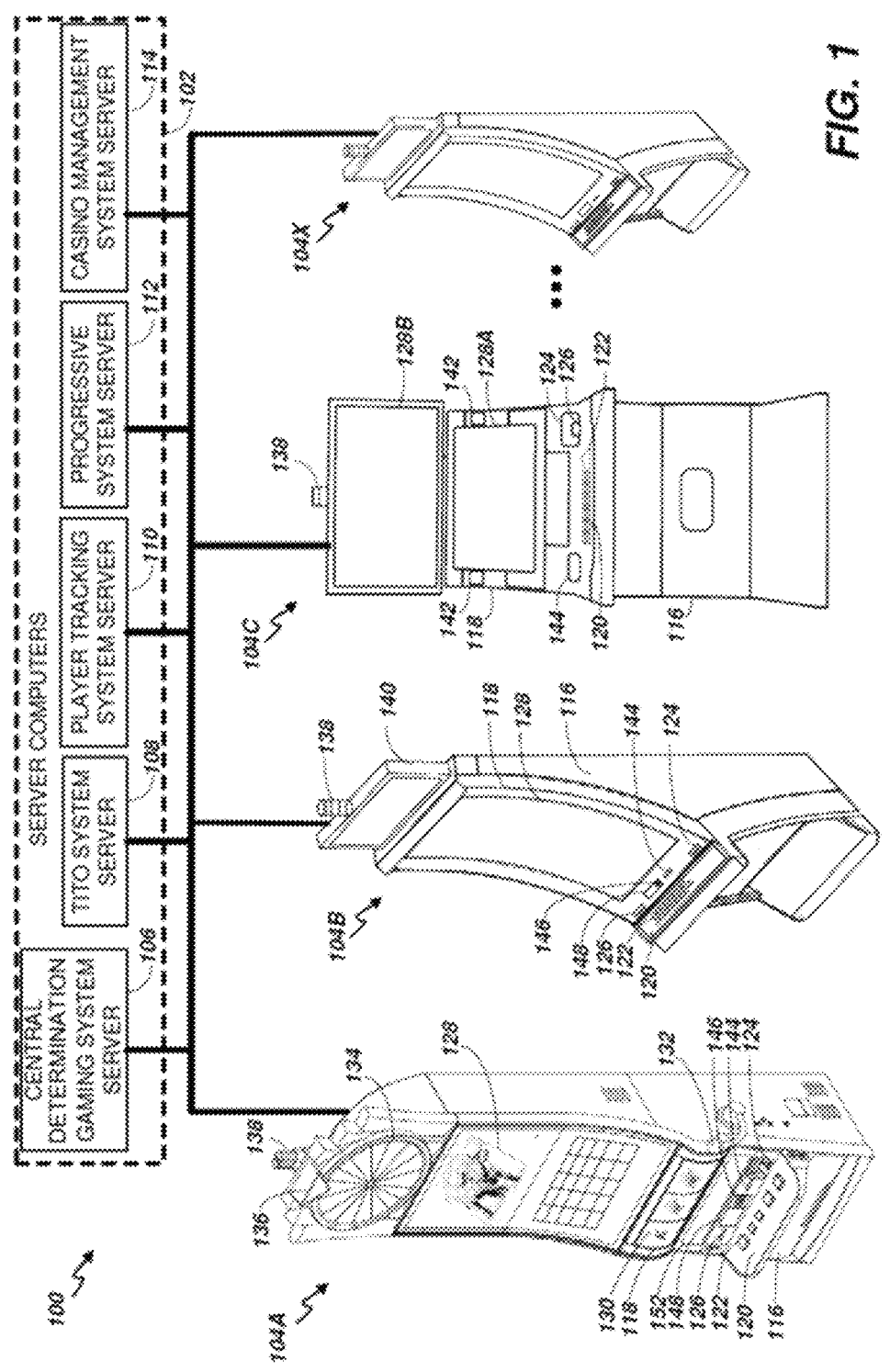
FIG. 1 is an exemplary diagram showing several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
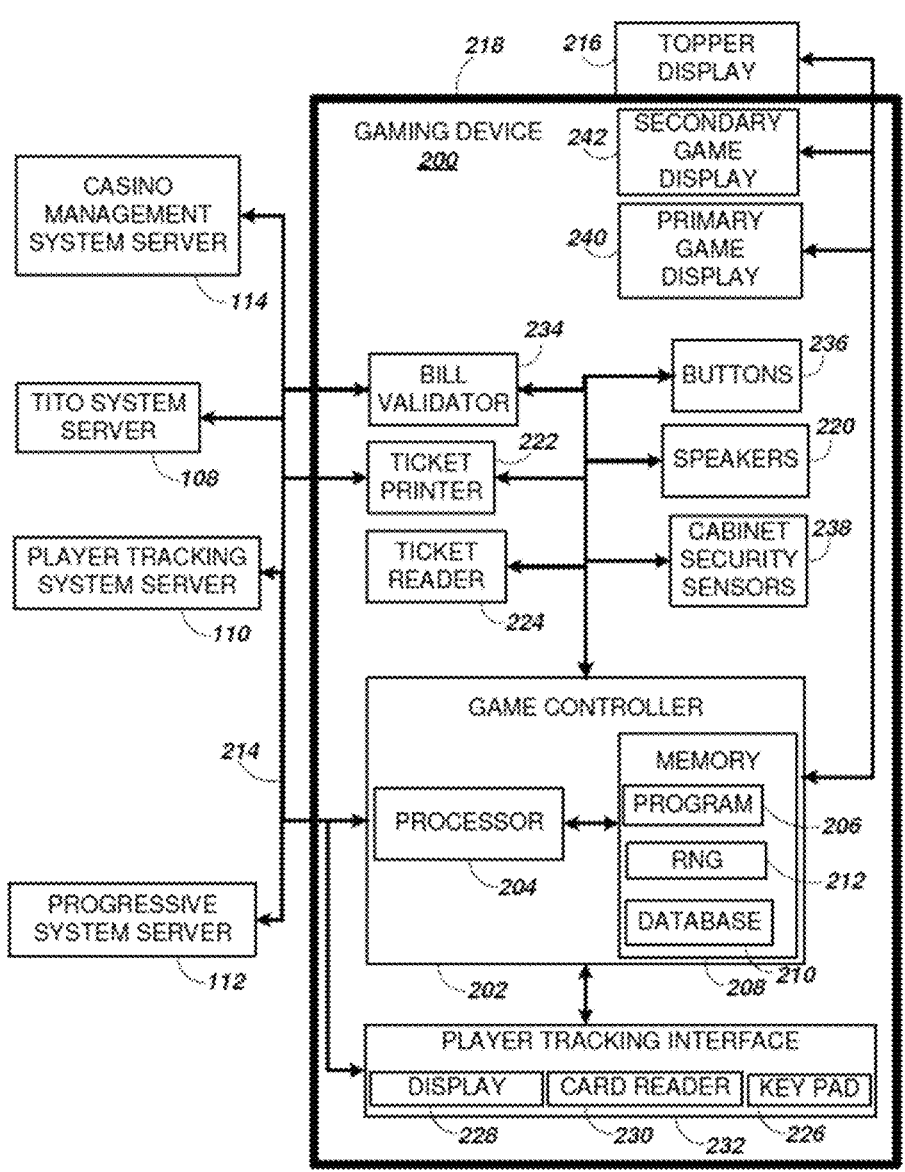
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device

200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a credit input mechanism such as a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The credit balance may be stored in a meter in memory 208 (or in a separate hardware meter). In some embodiment, memory 208 implements a credit meter to monitor to the credit balance and has a win meter that monitors any amounts won during any game instance(s) resulting from the wager. The balance of the win meter is transferred to the credit meter prior at the conclusion of the game instances. The player may also optionally insert a loyalty club card into the card reader 230. In some embodiments, the loyalty club card may also act as a credit input mechanism, by allowing a player to transfer funds from a centrally stored balance in order to establish a credit balance. During the game, the player views the game outcome on the game displays 240, 242. Other game and prize information may also be displayed.

When the player is done, he/she cashes out the credit balance (typically by pressing a cash out button to receive a ticket from the ticket printer 222). The ticket may be "cashed-in" for money or inserted into another machine to establish a credit balance for play.

Figure 5:
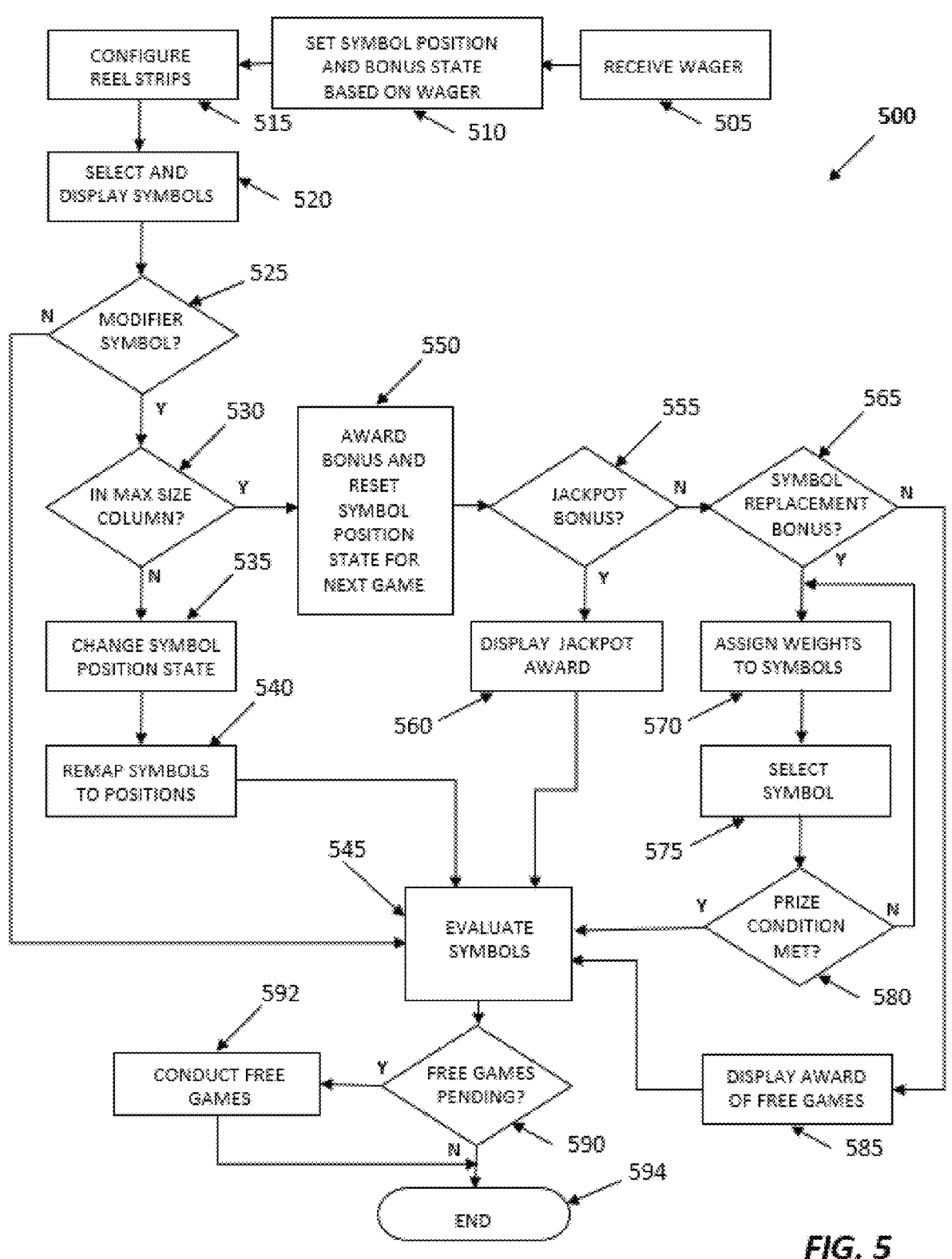
FIG. 5 is a flow chart of a method of operating a gaming device.

FIG. 5 is a flow chart of an example embodiment of a method 500 of operating a gaming device. At step 505, the processor 204 receives a wager input by a player using an input mechanism, in this example a virtual button deck—that is a touch screen display that displays virtual buttons that the player can "press" by touching the virtual button deck where one of a plurality of buttons is displayed.

Figure 6:
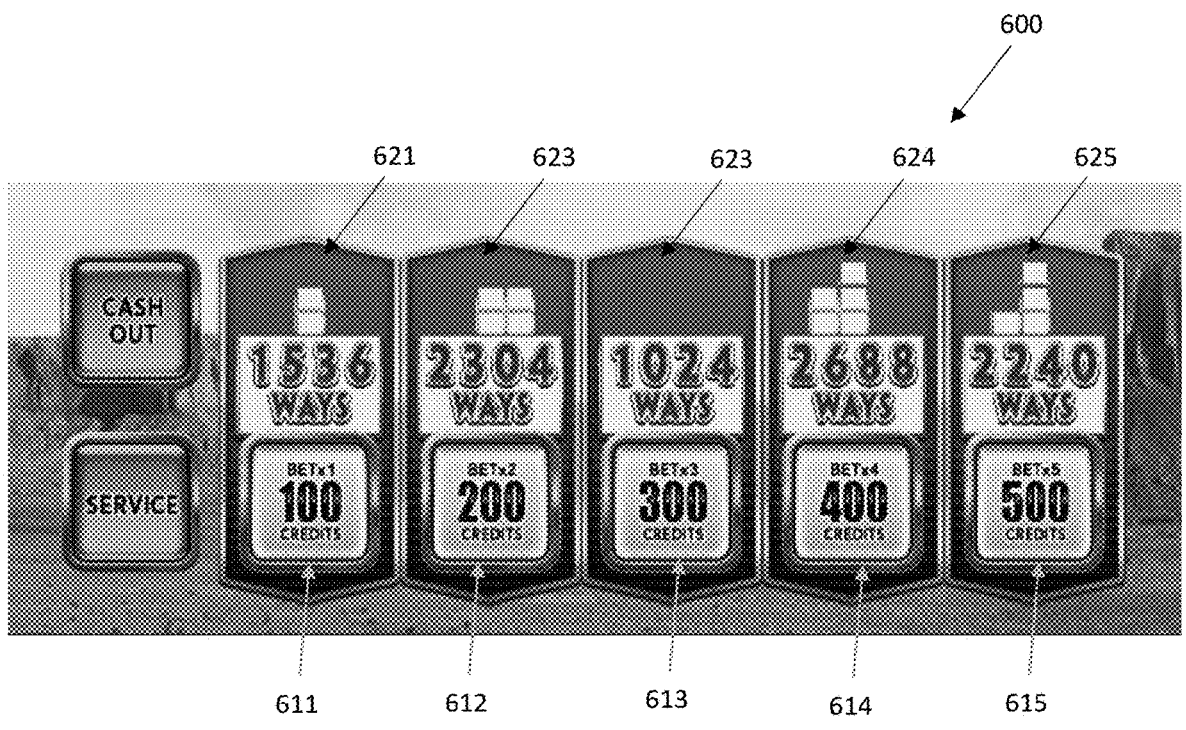
FIGS. 6 to 30 are example screen displays resulting from operating the gaming device.

FIG. 6 is an example of a virtual button deck 600 where the player can select between five different wager amounts by selecting one of the five different buttons 611-615. Above each button 611-615 is an indicator 621-625 of a current symbol position state associated with the respective wager amount. As will be explained below, the symbol position state can change to incorporate additional symbol positions as a result of events during a game instance which provide additional ways to win. In the example, different game states are associated with specific wagers to avoid anomalies that would arise if a common game state were used across multiple bet types.

In this respect, the symbols selected by processor 204 and which are then used in subsequent steps (e.g. evaluation of winning outcomes) depend on the current symbol position state. In this example, a base symbol state comprises an arrangement of five columns of symbol positions, each having four symbol positions. In the example, indicator 623 for the 300 credit wager button 613 is an indicator corresponding to the base symbol state. In this example, the rectangular indicator 623 represents the five by four gird of the base symbol position state and the text "1024 Ways" corresponds to the available number of evaluations for winning combination using a "ways to win" type evaluation where symbols at symbol positions of a respective column can by combined in any way so that there are 4*4*4*4*4=1024 different possible combinations and hence there are 1024 ways to win.

In this example, each of the second, third and fourth columns of symbol positions can have up to three additional active symbol positions for which symbols will be selected depending on the symbol position state. That is, each unique symbol position state corresponds to a different arrangement of symbol positions. The other indicators 621, 622, 624 and 625 of FIG. 6 correspond to some possible symbol position states. For example; indicator 621 corresponds to a symbol position state where two additional symbol positions are active in the middle (third) column of symbol positions so that there are 4*4*6*4*4=1536 ways to win; indicator 622 corresponds to a symbol position state where two additional symbol positions are active in the second and third columns of symbol positions so that there are 4*6*6*4*4=2304 ways to win; indicator 624 corresponds to a symbol position state where two additional symbol positions are active in the second column of symbol positions and three additional symbol positions are active in the third column so that there are 4*6*7*4*4=2688 ways to win; and indicator 625 corresponds to a symbol position state where one additional symbol position is active in the second column of symbol positions and three additional symbol positions are active in the third column so that there are 4*5*7*4*4=2240 ways to win.

At step 510, the processor 204 sets the current symbol position state (the state to be used for the next game instance) based on the received wager. At step 515, the processor 204 configures the reel strips to be used for the game based on reel strip data stored in memory. In this example, the processor only configures the third reel strip, however, in other embodiments more than one reel strip may be configured.

FIG. 3 illustrates an example of a set 300 of five reel strips 341, 342, 343, 344, 345. In the example, for illustrative purposes, twenty-five reel strip positions 301-325 are shown for each reel strip 341-345. Each reel strip position of each reel has a symbol. For example, a "Wild" symbol occupies the twenty-second reel strip position 322 of the fourth reel strip 344. The symbols shown on the reel strip are generally indicative of symbols that may be employed in other embodiments, however, other reels strips to those illustrated in FIG. 3 can be used, for example, reel strips where two or more wild symbols are placed at consecutive reel strip positions of a reel strip. Symbol position 330 indicates that the reel strips 341-345 may have more symbols than illustrated. For example, the reel strips 341-345 could have between 30 and 100 reel strip positions with the last reel strip position of a respective reel strip being treated as contiguous with the first reel strip position 301 as would be the case with a mechanical reel. The actual lengths of the game reel strips depend on factors such as the lengths of the stacks, the number of wild symbols (in general, the more wilds there are, the longer the reel strip needs to be to maintain the target RTP), and volatility (in general, the higher the prize value is, the longer the reel strip needs to be to lower the hit rate to maintain the target RTP). In some examples, the reel strips associated with different columns may be of different lengths to one another.

The first to third reel strips have "Dynamic" symbols which are configurable. For example, third reel strip 343 has two "Dynamic" symbols at the second 302 and twenty-first 321 reel strip positions respectively. The processor 204 configures the Dynamic symbols in each game instance by using random number generator 212 to select a symbol from a plurality of symbols using one of two weighted tables stored in memory 208 which for part of the reel data. In an example, Table 1 is used when the maximum number of symbol positions (here seven) are active for the third column in the current symbol state and Table 2 is used in all other instances.

TABLE 1

| Symbol | Relative Probability |
|---|---|
| PIC1 | 0.95 |
| Modifier 1 (associated with first bonus) | 0.04 |
| Modifier 2 (associated with second bonus) | 0.01 |

TABLE 2

| Symbol | Relative Probability |
|---|---|
| PIC1 | 0.95 |
| Modifier 1 | 0.05 |

It will be appreciated that in this example, when the maximum number of symbol positions are active, the weighted table enables two different modifier symbols to be selected as the dynamic symbol in a way which controls the hit rates for awarding two different bonuses associated with the first and second modifier symbols respectively when the maximum number of symbol positions are active while only the first modifier symbol will occur in other symbol position states for reasons that will become apparent from the examples below. It will be appreciated the dynamic symbols on other reel strips could be configured using the same or different weight tables technique in order to control their respective hit rates. In some examples, the relative probabilities may depend on the amount wagered.

At step 520, the processor 204 selects symbols from the configured reel strips and controls the display 240 to display the selected symbols.

Figure 4:
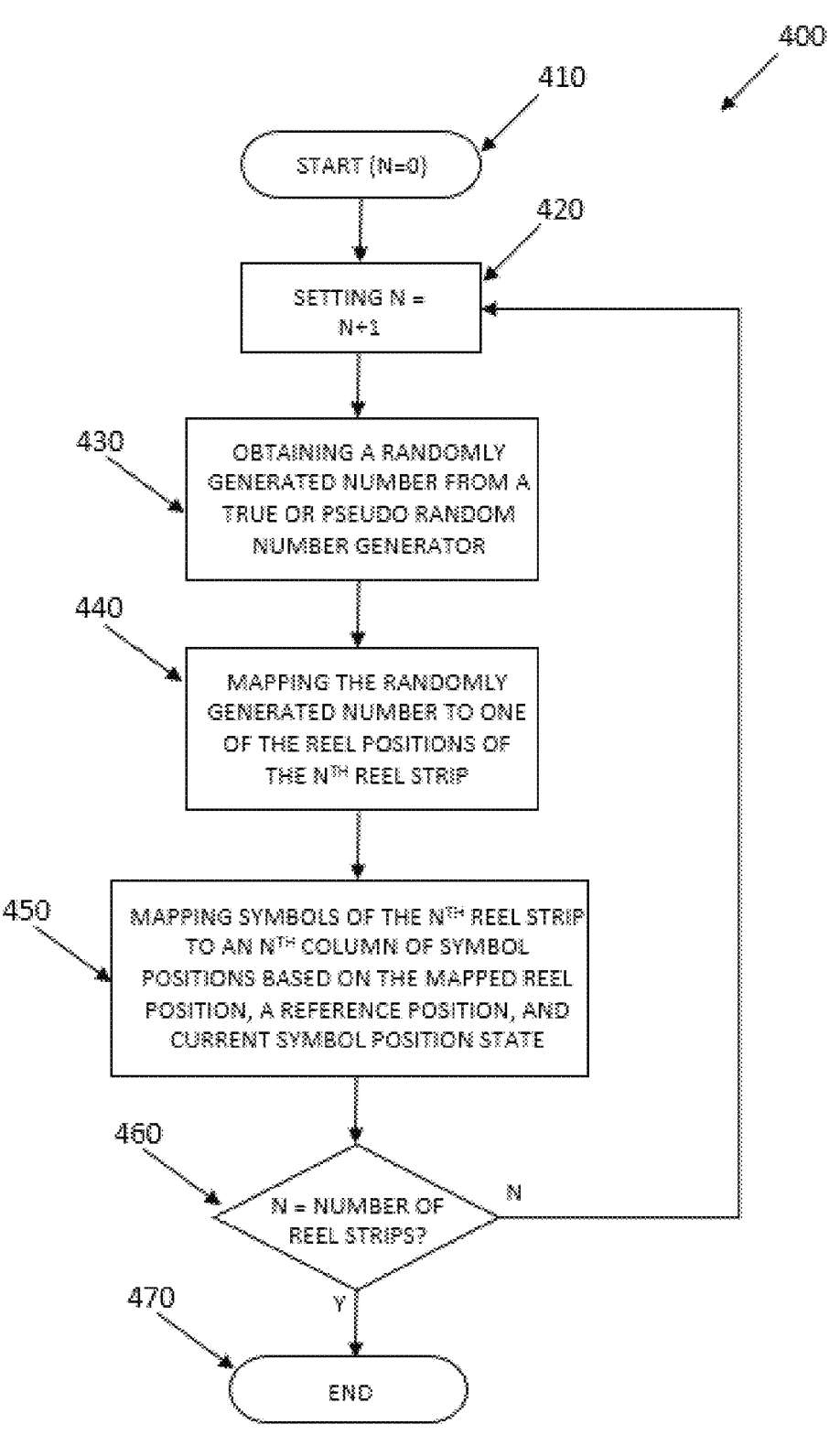
FIG. 4 is a flow chart of a symbol selection method.

FIG. 4 is a flow chart of an example method 400 carried out by the processor 204 to select symbols from reel strips at step 510. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430, the processor obtains a randomly generated number from a true or pseudo random number generator 212. At step 440 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions.

At step 450, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. Referring to the example reel strips of FIG. 3, if the value returned by the RNG 212 is mapped to reel position 313 when four symbols are being selected for the first column of symbol positions, then for the first reel strip 341, "10" is mapped to a bottom symbol position and the three symbols immediately above it (here "PIC3", "A", and 9") are mapped to the symbol positions above the symbol position while preserving the reel strip order of the first reel strip. For the columns of symbol positions that change, the number of symbols mapped depends on the current symbol position state such that each time the number of active symbol positions increases by one for a column, an additional symbol position is mapped for that column.

At step 460, the processor 460 determines whether symbols have been selected for all of the reel strips, and if not the processor 204 reverts to step 420 and iterates through steps 430, 440 and 450 until it is determined at step 460 that symbols have been selected from all n reel strips and mapped to all n columns of symbol positions after which the symbol selection process ends 470. It will be appreciated that in other examples, there may different numbers of symbol positions for either the base or maximum numbers of symbol positions in a respective column.

After the symbols of all reel strips have been mapped to symbol position, the processor 204 controls display 240 to display them at the symbol positions.

Figure 7:

FIG. 7 is an example screen display 700 of symbols selected for where the current symbol position state corresponds to an arrangement of symbol positions where there are four active symbol positions in the first, third, fourth and fifth columns 711, 713-715 and five active symbol positions in the second column 712.

As shown in FIG. 7, above the arrangement of symbol positions are a plurality of bonus icons 721-723, 730. Each of bonus icons 721-723 is sized and positioned to indicate their relationship to the second, third and fourth columns of symbol positions 712-714 (also known as reels 2 to 4). Each of the bonus icons 721-723 is positioned so that when the associated column 712-714 grows to seven symbol positions high, the bonus icon 721-723 will be adjacent the top symbol position of the respective column. This placement helps communicate to the player that after a respective column has reached a maximum number of symbol positions, there is an opportunity for the associated bonus to be awarded. In this example, bonus icons 721, 723 correspond to the Stampede bonus but as will be explained in further details, the bonuses at these positions can change to another bonus. Bonus icon 722 corresponds to the Super Stampede bonus and this bonus is fixed. Above the Super Stampede bonus icon 722 is a Jackpot meter 730 that indicates that a Jackpot bonus can also be won from the third column 713 as will be described further below.

Arrow heads on the top of columns that can grow such as arrow head 761 indicate to the player that the columns can grow (have symbol positions added). Message 742 indicates that when a Gold Arrow modifier symbol lands, this "Wins The Jackpot!" Message 741 explains to the player the occurrence of a "Purple Arrow" modifier symbol "Grows Reel 2, 3 OR 4—i.e. adds a symbol position to one or more of the second to fourth columns. Both arrow symbols point upwards to indicate the direction of growth.

FIG. 7 shows an example where a "Purple Arrow" modifier symbol has been selected. Accordingly, at step 525 processor 204 will make a positive determination that a modifier symbol is included in the selected symbols and proceed to step 530. At step 530, the processor 204 will make a negative determination that the size of the column in which the "Purple Arrow" modifier symbol was selected is a maximum size because as shown in FIG. 7, the second column 712 had five symbol positions active of a possible seven. At step 535, the processor changes the current symbol position state corresponding to the selected wager by adding a symbol position to the second column. In this example, the symbol position is added before the symbols are evaluated by the processor 204 for winning combinations.

Figure 8:
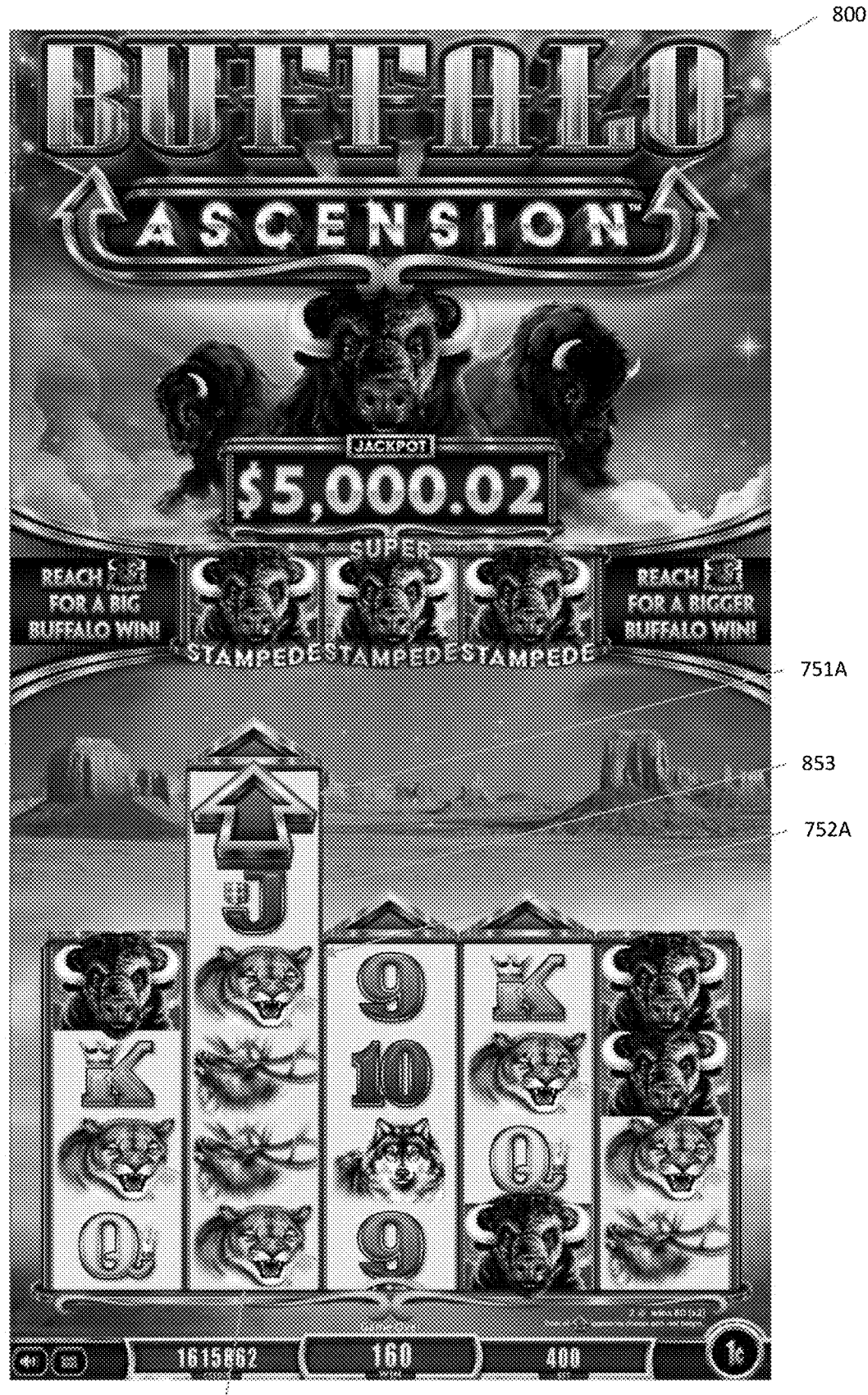

In this respect, FIG. 8 is a subsequent screen display 800 that shows the added symbol position in the second column so that there are six symbol positions. In the example, and as shown in FIG. 8 at step 540, the processor 204 remaps the symbols from the reel strip to the symbol positions by moving "Purple Arrow" modifier symbol 751 to be a revised symbol position 751A of the column (the newly added position), moving "Cougar" symbol 752 downwards to revised position 752A and adding a J symbol 853 which is the next symbol in the reel strip corresponding to the second column. That is, the mapping process of step 450 is revised by the processor 204 removing the modifier symbol from and mapping the next symbols in the sequence in the reel strip to the symbol positions of the second column 712.

At step 545, the processor 204 evaluates the symbols for one or more winning combinations based on a pay table stored in memory 208. In this example, processor 204 applies a "ways to win" type evaluation by processing the selected symbols to identify instances of the same symbol appearing in consecutive ones of the columns 821-925 starting with (and including) the first column. Upon there being one or more winning combinations, the processor 204 makes an award at, for example, by adding credit amounts defined by the pay table to a win meter in memory 204. In this example, the evaluation at step 545 also includes determining whether the selected symbols include sufficient scatter symbols to award free games as described in more detail below.

Assuming there are no free games pending at step 590, the game instance ends at step 594.

Figure 9:
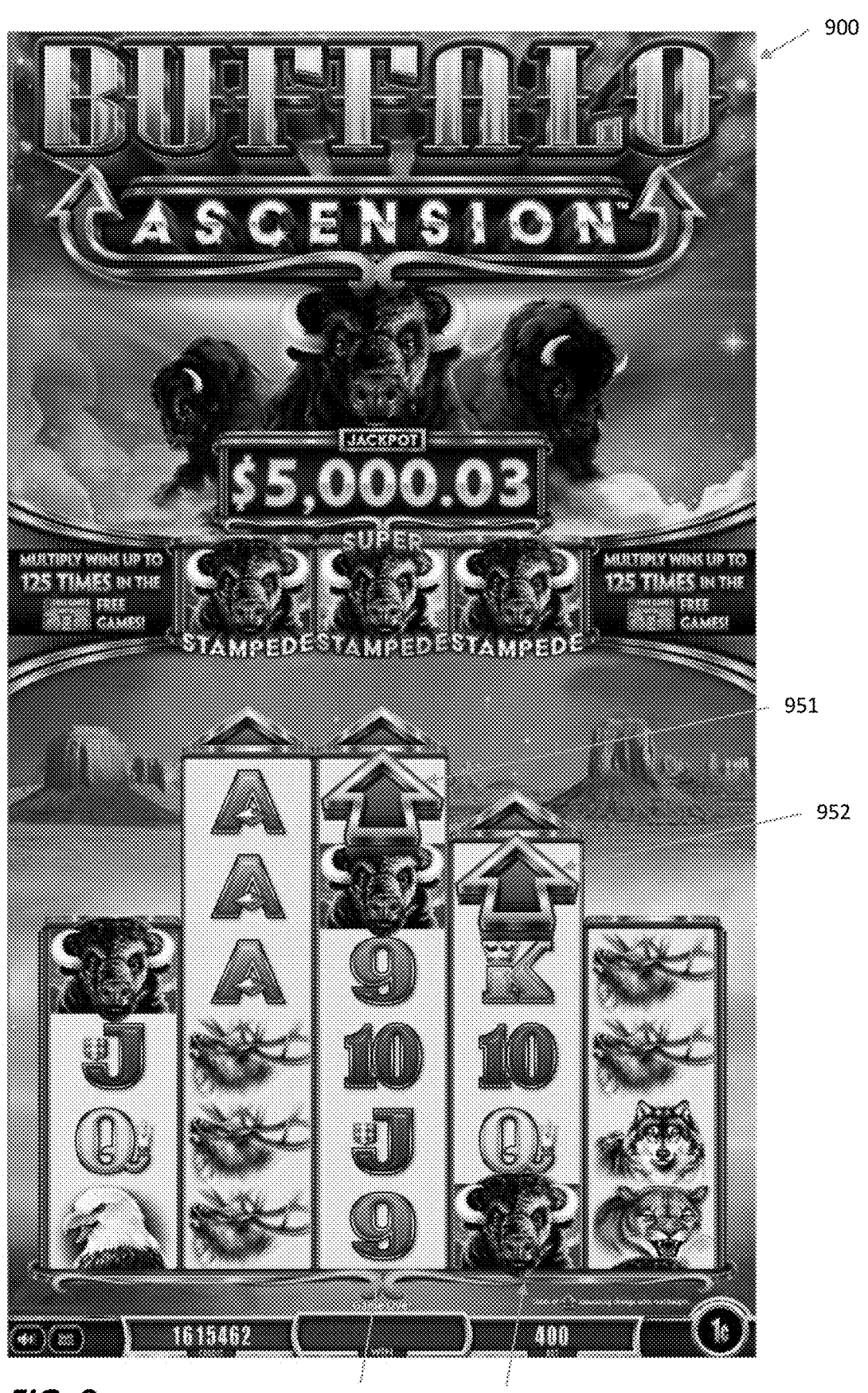

FIG. 9 shows an example of a subsequent display screen 900 where the symbol position state has changed responsive to two purple arrow modifier symbols 951,952 being selected in the third and fourth columns 713, 714. This display screen 900 shows that more than one column can be changed at a time.

Figure 10:
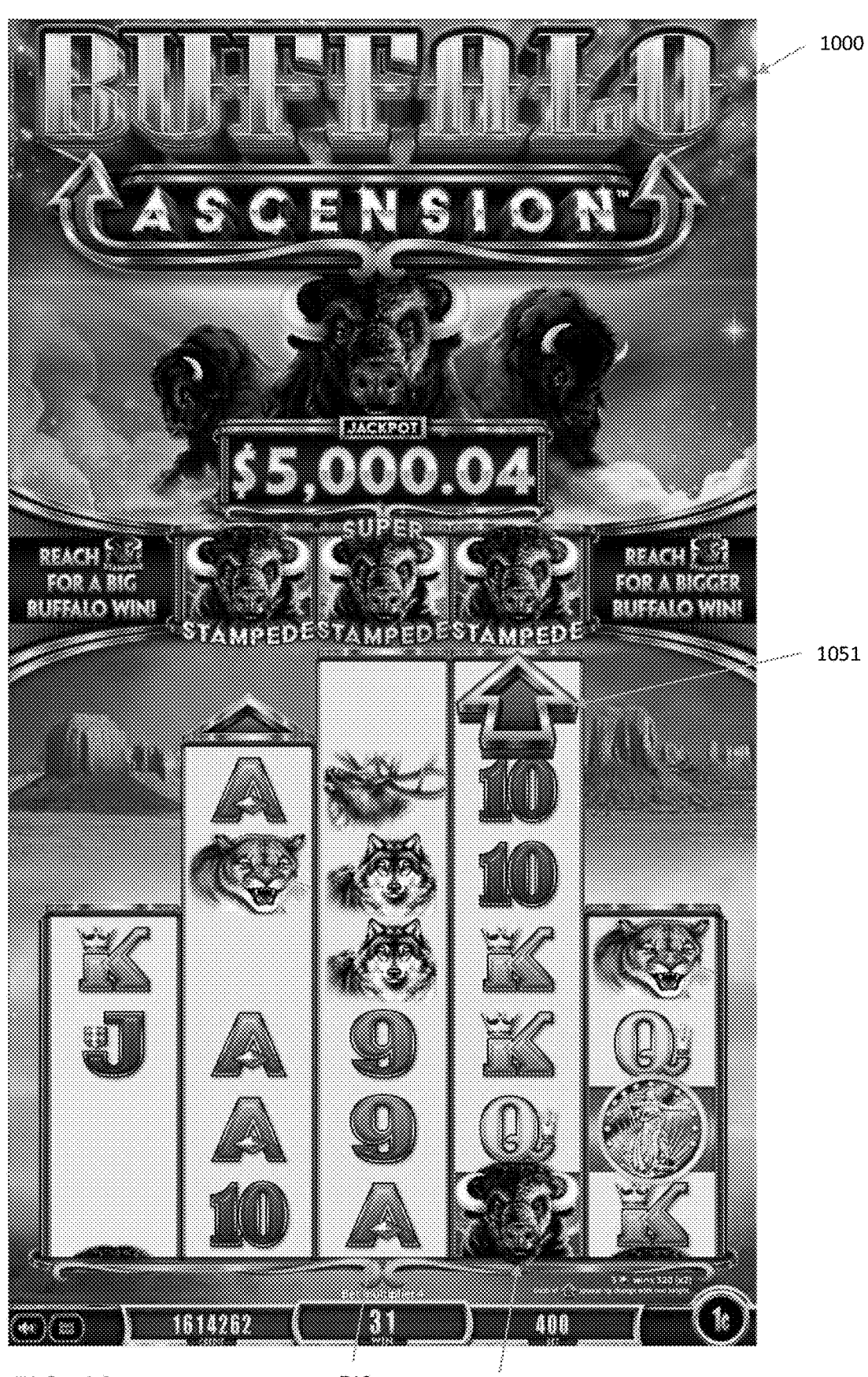

FIG. 10 is an example of a subsequent display screen 1000 where the symbol position state is that the third and fourth columns 713, 714 have reached maximum height with the screen display 1000 showing that purple arrow symbol 1051 has been removed from the symbol position at which it was selected and moved to the added top symbol position of the fourth column 714 and symbols of the fourth reel strip have been remapped 540 to symbol positions of the fourth column 714. FIG. 10 appears to have a number of symbol positions without because the screen display 1000 corresponds to a prize award animation following a symbol evaluation at step 545 in which the symbols of a winning combination flash on and off.

Figure 11:
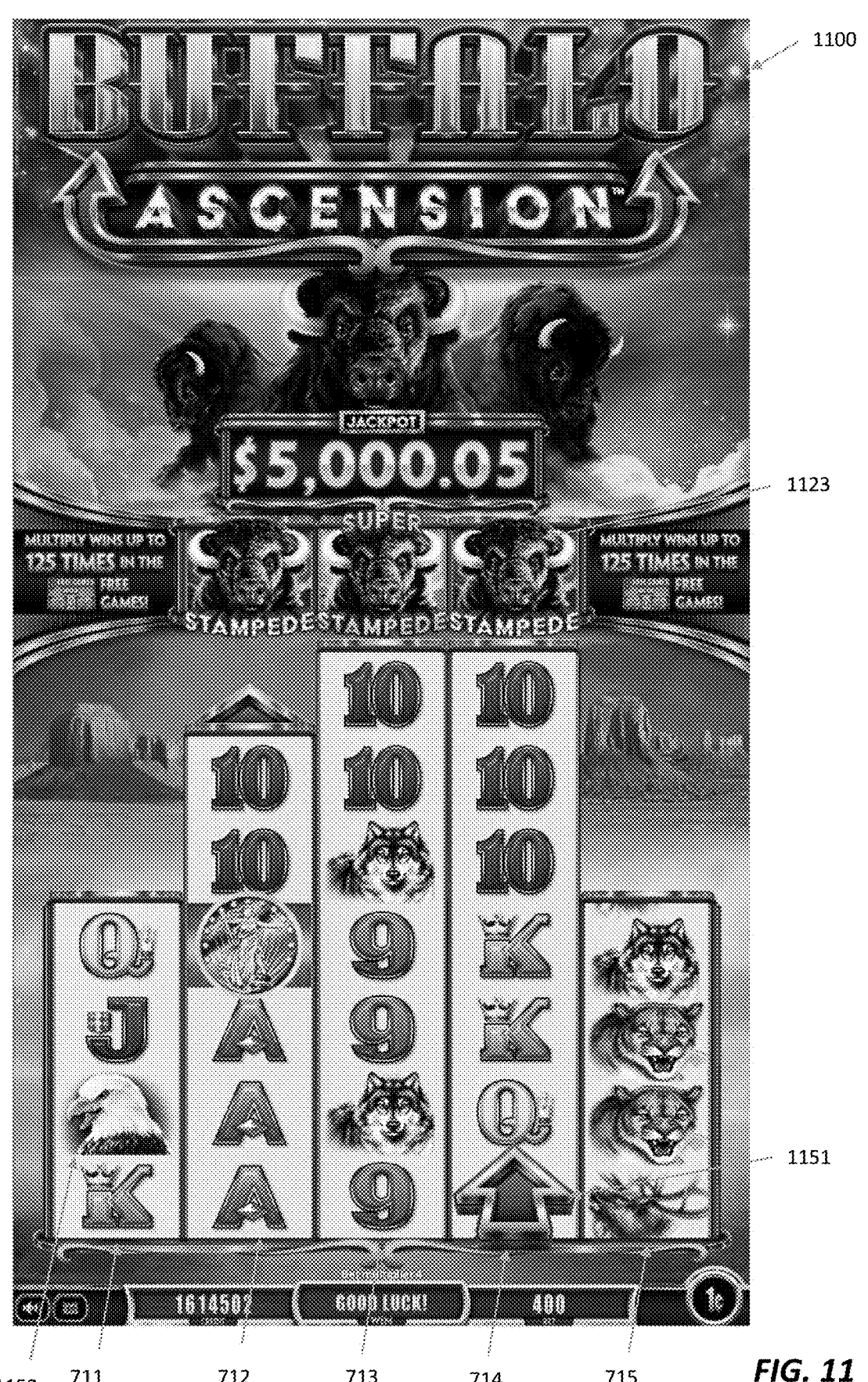

FIG. 11 is an example of a subsequent display screen 1100 where purple arrow symbol 1151 has been selected for the bottom symbol position of the fourth column 714. Accordingly, at step 525 the processor 204 will make a positive determination that there is a modifier symbol and then at step 530 will make a positive determination that the modifier symbol is in a maximum size column (a column having the maximum number of symbol positions).

At step 550, the processor 204 awards the "Stampede" bonus as indicated by bonus icon 1123 in FIG. 11. The "Stampede" bonus involves replacement of symbols as described in further detail below and hence is a "symbol replacement bonus". In this example, there are three possible bonuses that can be assigned by the processor 204 the second and fourth columns 712,714. In an example, the three bonuses: a free games feature; the "Stampede" symbol replacement feature; and a "Super Stampede" symbol replacement symbols which involves the replacement of more symbols than the "Stampede" replacement feature. In this respect, processor 204 assigns bonuses to the second and fourth columns 712,714 based on a weighted table using random number generator 212 with the Stampede bonus being the most likely to be set, the free games the next most likely and the "Super Stampede" the least likely. When a bonus from the second or fourth columns 712,714 is awarded, the processor 204 assigns a new bonus to the respective column prior to the next paid game instances.

In the example of FIG. 11, when the processor 204 awards a "Stampede" bonus, at step 555 processor 204 will make a negative determination and proceed to step 565. At step 565, processor 204 will make a positive determination that a symbol replacement bonus has been awarded and proceed to step 570 and assign weights to symbols as the initial step of a process to add more PIC1 symbols to the displayed symbols. In this example, the "PIC1" symbol is the "Buffalo Symbol" and no Buffalo symbols appear in the screen display 1100 of FIG. 11.

When there's no PIC1 on reel 1 (in the first column 711), the processor 204 first determines for each unique symbol on reel 1 what the win amount would be if that symbol were to be replaced with the PIC1.

The processor 204 uses a set of ranges stored in memory in order to assign weights as exemplified in Table 3. In an example, the ranges are multiplied by the bet amount so that, in effect, the ranges are independent of the bet amount.

TABLE 3

| Win Range | Weighting |
| --- | --- |
| Range 1 (lowest range) | 1 |
| Range 2 | 1000 |
| Range 3 | 10000 |
| Range 4 | 20000 |
| Range 5 (highest range) | 150 |

Processor 204 then uses the assigned weightings and the random number generator 212 to randomly select one of the unique symbols to change at step 575 and changes all instances of this symbol among the displayed symbols. In the example screen displays 1100,1200 of FIGS. 11 and 12, the result of this process is that "Eagle" symbol 1152 is changed to the "Buffalo" symbol 1252. Note that each symbol is given a chance of being changed so that in the case of all symbols corresponding to the lowest win range, a symbol is changed. That is, making symbols corresponding to the lowest win range unable to be selected would potentially result in some instances where no symbol could be selected by the processor 204. The weightings of the other ranges impact on the return to player from the bonus.

Figure 12:
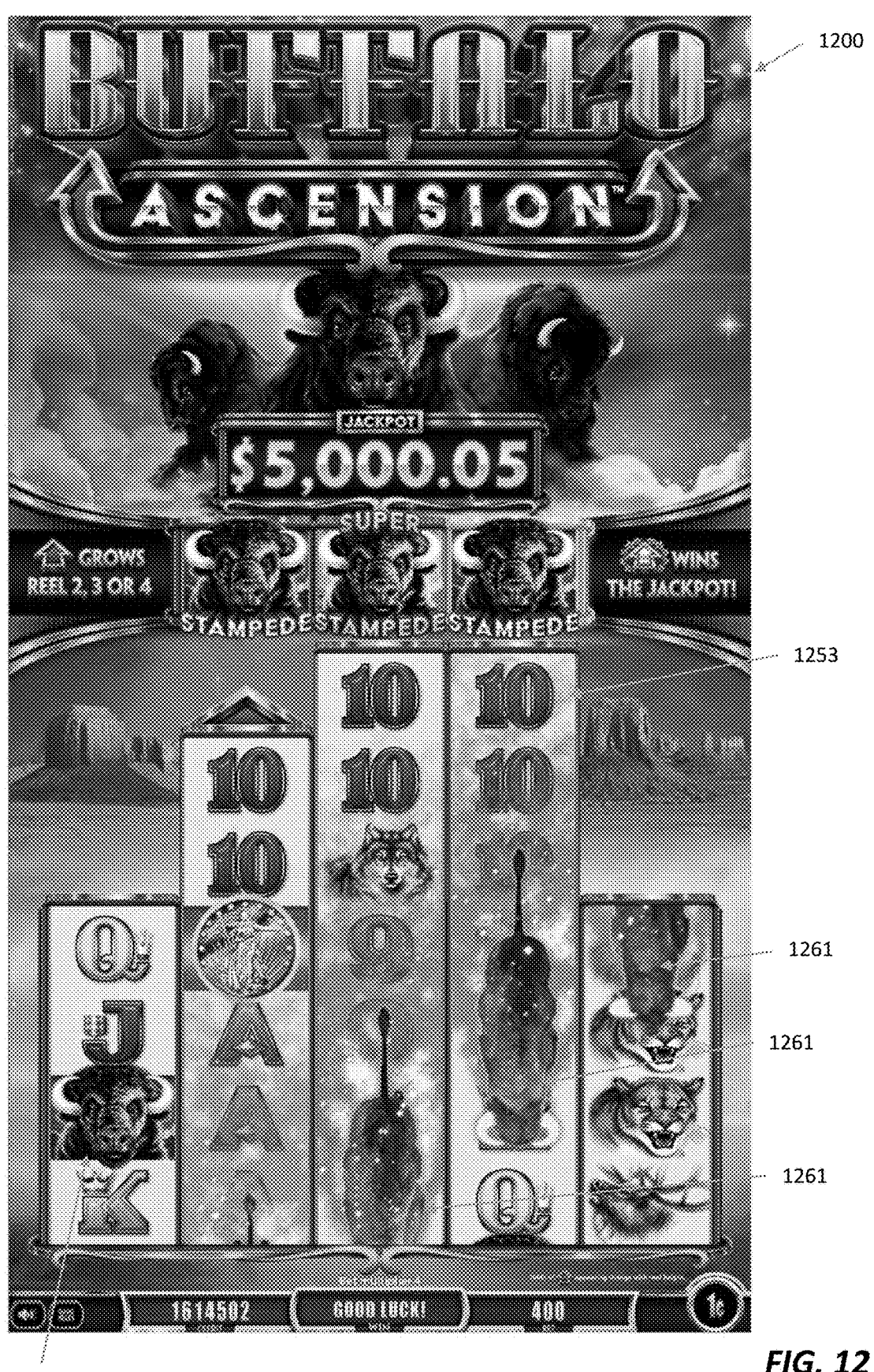
Figure 13:
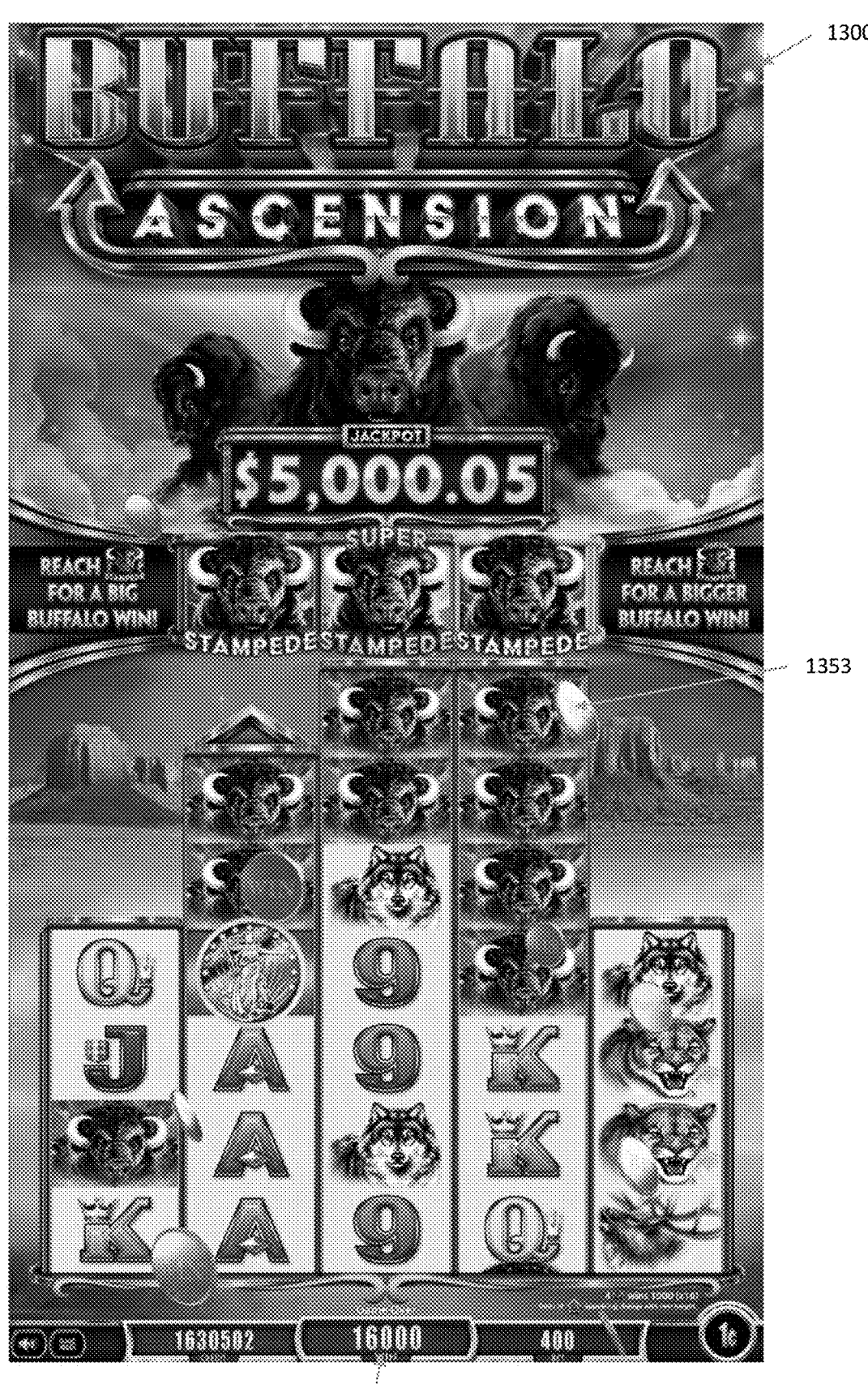

At step 580, the processor 204 determines whether a prize condition has been met based on this change, wherein the prize condition is, for example, that the increased prize resulting from this more than a defined multiple of the amount bet. When a prize conditions is not met at step 580, the processor 204 reverts to step 570. The example screen displays 1200,1300 of FIGS. 12 and 13 illustrate an example of this occurring. In this respect, FIG. 12 is a screen display that shows part of the animation that the processor 204 controls the display 240 to show as part of a subsequent selection process where animated buffaloes 1261 "stampede" downwardly over the reels until such time as they reveal the changes to the symbols resulting from the second iteration.

In this example, as a PIC1 symbol 1252 has been added to the first column 711, in this iteration, the processor 204 includes all unique symbols anywhere within the symbol positions when conducting step 570 of assigning weights by determining first what the win amounts would be for changing each of the symbols and using the ranges to assign weightings based on win amounts. Then at step 580, processor 204 uses the assigned weightings and the random number generator 212 to select one of the symbols. In this example, processor 204 selects the "10" symbol so that all 10 symbols in FIG. 12, such as 10 symbol 1253, are changed to Buffalo (PIC1) symbol, such as 10 symbol 1253, in FIG. 13. In an example, as well as any existing PIC1/Buffalo symbols, WILD and SCATTER symbols are not included so that they will not be changed.

As will be apparent from the above, the processes carried out by the processor 204 at step 570 in order to assign weights depend on the state of the symbols at the beginning of an iteration. In this respect, in the case where after a first iteration the replaced symbol is such that the win amount is zero, the processor 204 only processes symbols in the second column 712 to determine win amounts if those symbols were replaced and assigns weightings to those symbols based on the win amount.

In the case that at least one PIC1 symbol was initially selected in the first column 711, the processor 204 includes all unique symbols anywhere within the symbol positions during the first iteration of step 570 in order to determine win amounts associated with possible symbol changes and use them to assign weightings.

Returning to the example of FIG. 13, the prize condition is met 580 after replacement of the 10 symbols with the Buffalo/PIC1 symbol, processor 204 proceeds to step 545 and evaluates the symbols for winning combinations and animates any wins on the display before adding the wins to win meter 1301.

Figure 14:
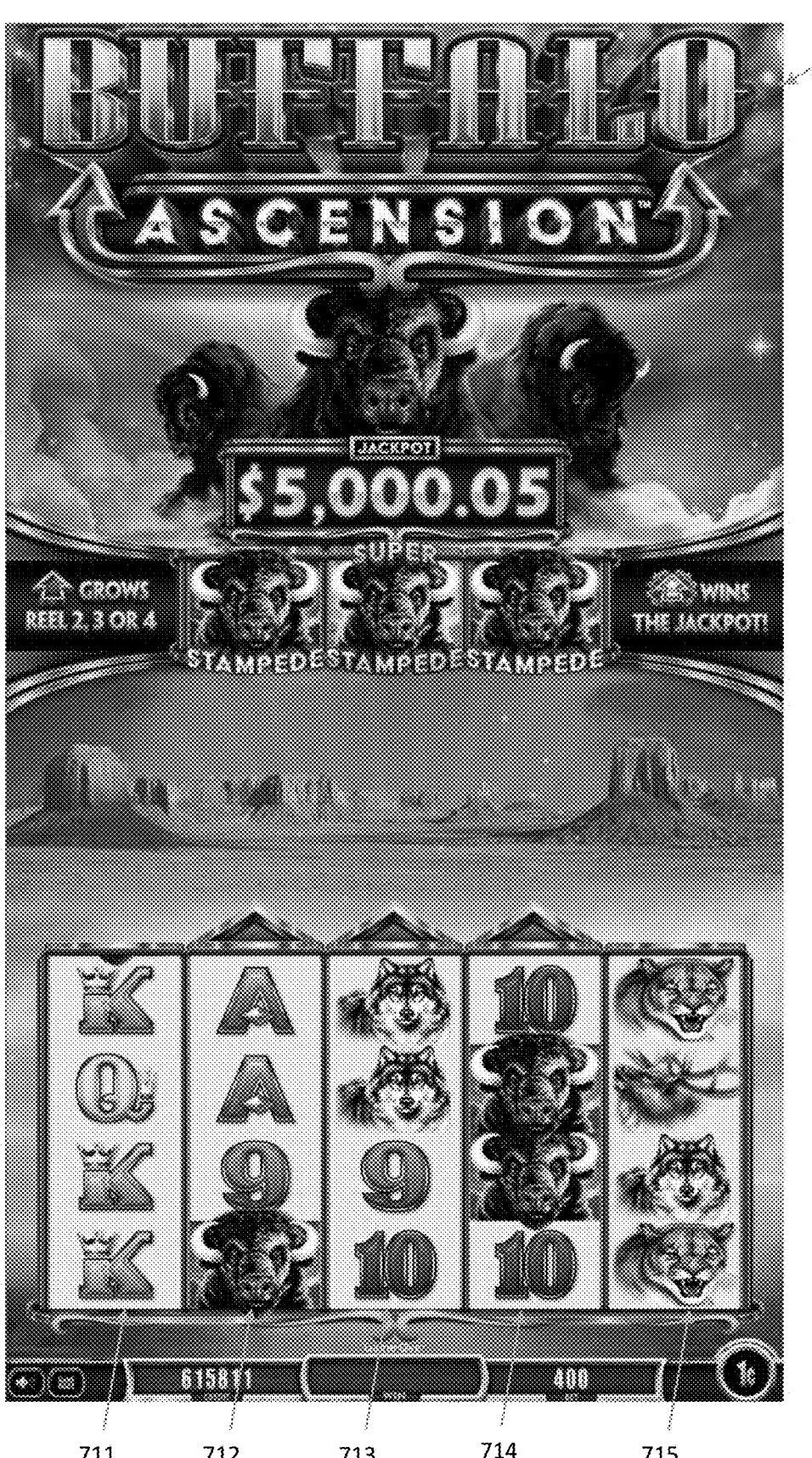

As indicated above, at step 550, processor 204 resets the symbol position state for the next game, accordingly, at the same wager amount, the processor 204 will control the display to display the base arrangement of symbol positions in the next paid game as shown in the example screen display 1400 of FIG. 14 where there are only four symbol positions in each of the second to fourth columns 712-714.

Figure 15:
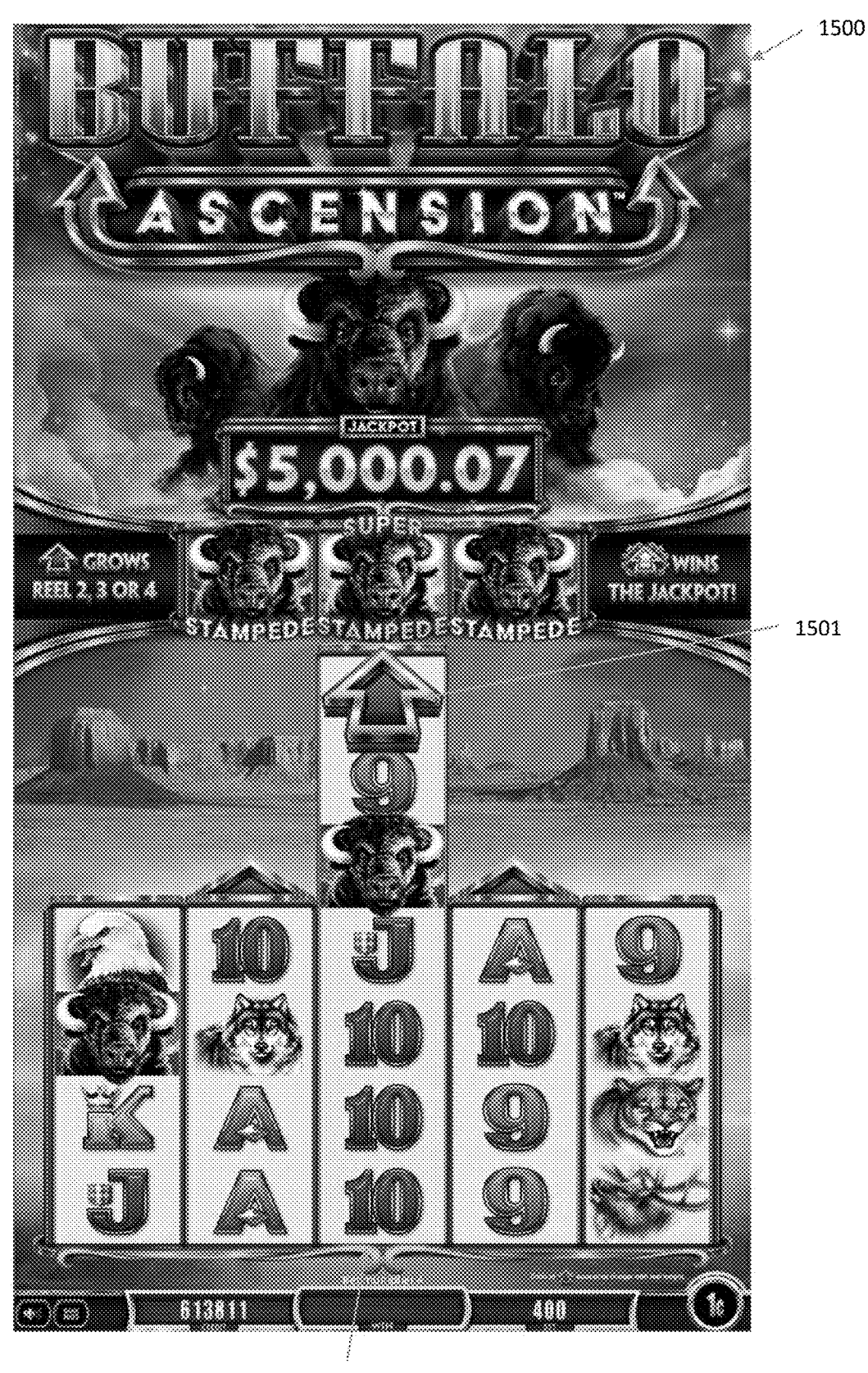
Figure 16:
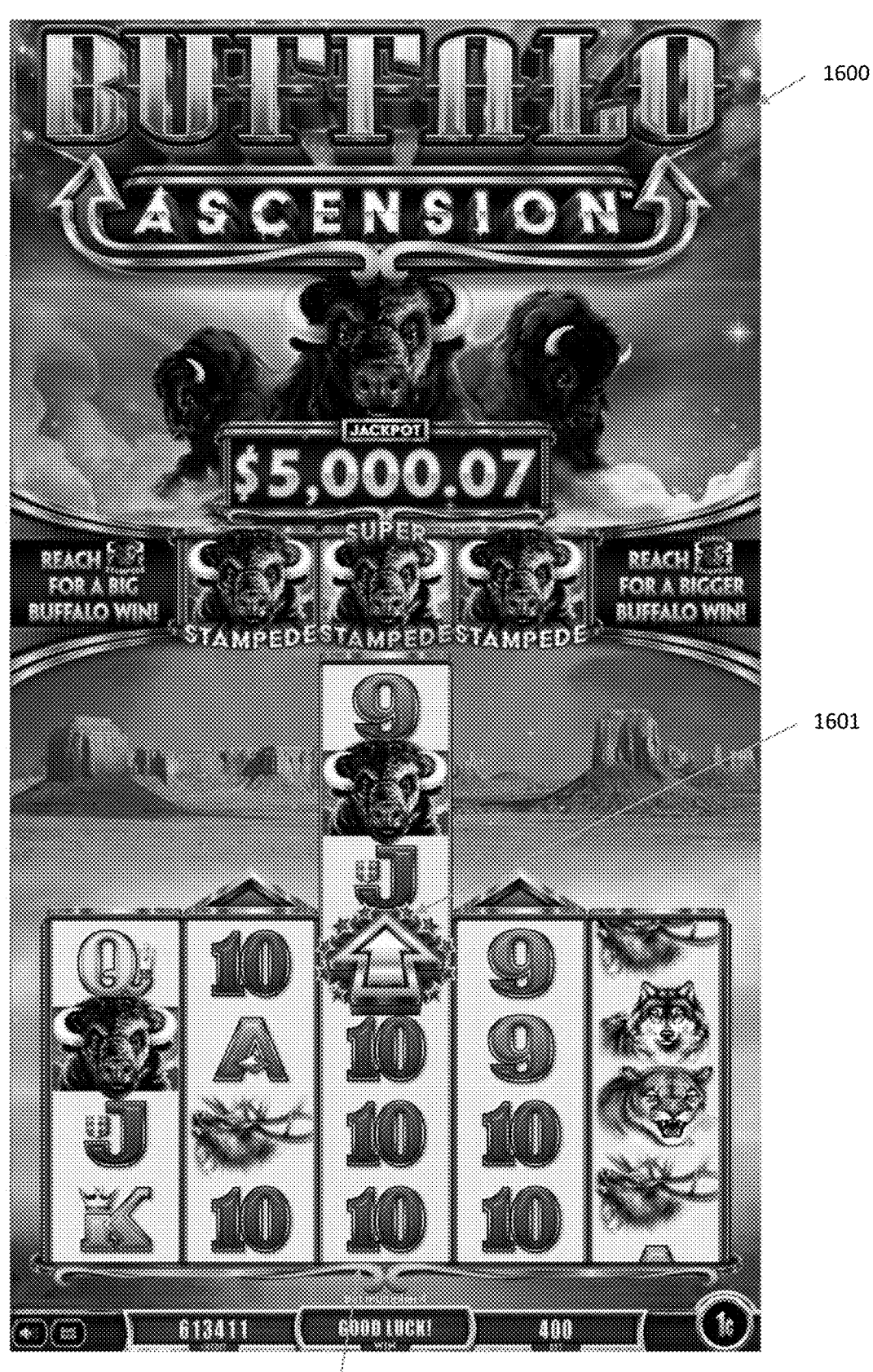
Figure 17:

FIGS. 15 to 17 are example screen displays 1500, 1600, 1700 corresponding to the award of a jackpot bonus by processor 204. FIG. 15 is a screen display 1500 after the processor 204 has remapped symbols to positions at step 540 following a Purple Arrow 150 modifier symbol being selected at step 520. In this case, Purple Arrow modifier symbol 1501 has been moved to the top symbol position of the third column 713 of symbol positions so that the third column 713 of symbol positions has reached the maximum number of symbol positions.

FIG. 16 is a screen display 1600 corresponding to a subsequent screen display where a Gold Arrow symbol 1601 has been selected by the processor 204 at step 520. As previously described, this requires the processor 204 to have configure the dynamic symbols of the third reel strip with the Gold Arrow symbol at step 515.

Accordingly, at steps 525 and 530 processor 204 will make positive determinations and proceed to step 550 where it will award the jackpot bonus by adding the amount to a win meter or credit meter or initiating a signal for an attendant to make a hand pay. At step 555, the processor 204 makes a positive determination that a jackpot bonus has been awarded and at step 560 controls the display 240 to display a jackpot award 1701 as shown in example screen display 1700 of FIG. 17.

Figure 18:
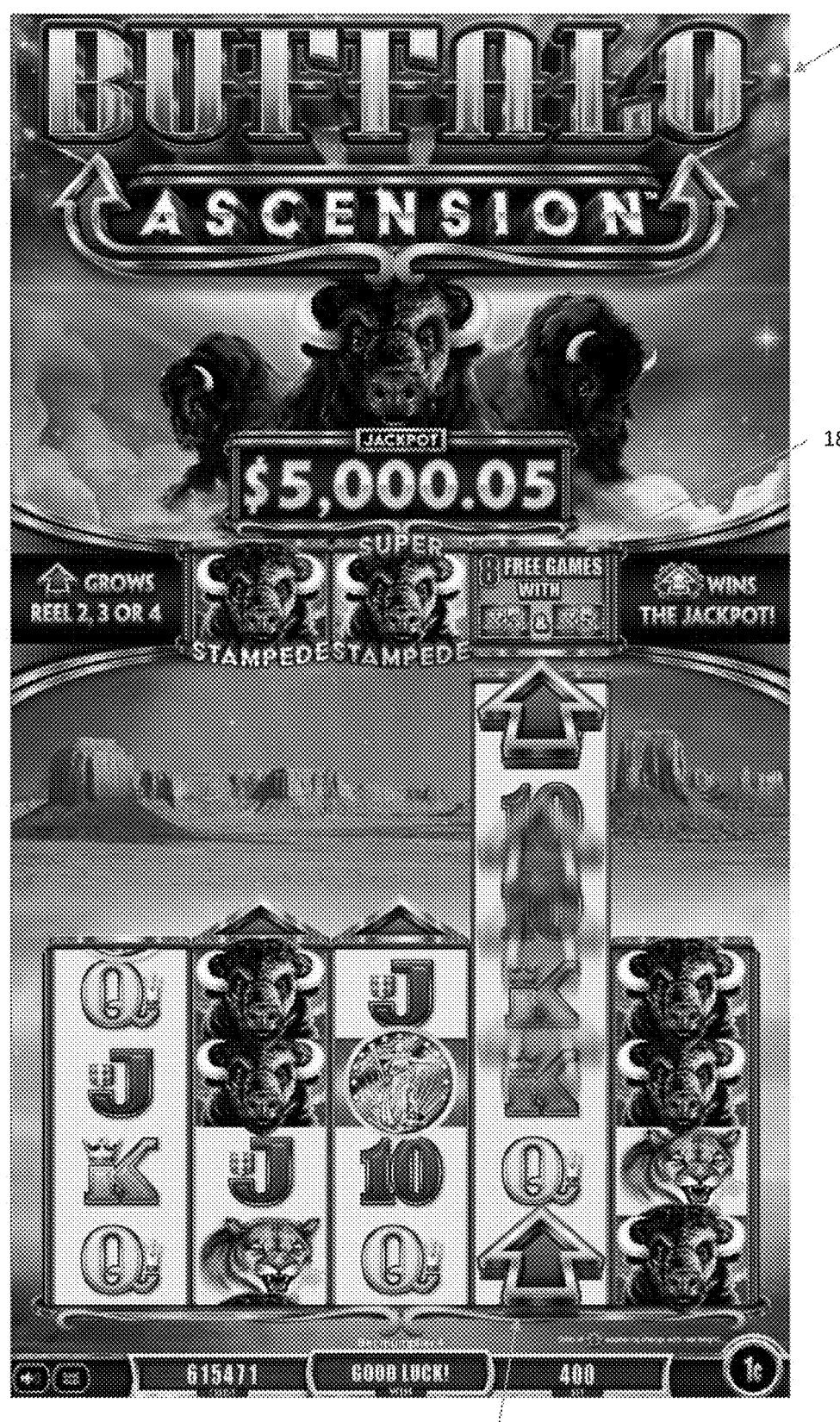
Figure 19:
Figure 20:

FIGS. 18 to 20 illustrate an example of where the awarded bonus is a series of free games (additional game instances no requiring a further wager). In this example bonus indicator 1823 shows that if the bonus is awarded, the player will be awarded "8 Free Games with ×3 and ×5". FIG. 18 shows an example screen display 1800 where a Purple Arrow has been selected and is being animated by processor 204 as moving towards the bonus indicator 1823. Positioning of the bonus indicator to be adjacent to the top symbol position and sizing it to be of similar dimensions to the symbol positions, advantageously helps communicate to the player that landing of a Purple Arrow modifier symbol will result in the award of the bonus feature represented by the bonus indicator 1623.

Accordingly, in this example, processor 204 will make positive determinations at steps 525 and 530 before proceeding to step 550 where it will award the free game bonus. Processor 204 will then make negative determinations at steps 555 and 565 before proceeding to step 585 and controlling the display 240 to display the award of free games 1901 as shown in example screen display 1900.

At step 545, processor 204 evaluates the symbol for any winning combinations based on pay table in memory 208. Then, at step 590, processor 204 will make a positive determination that free games are pending and proceed to step 592 and conduct the free games. In this example, each of the free games includes all of the steps of a game instance as described above, and hence the chance of the award of a further bonus, however the symbol position arrangement reset does not take effect until after the free games have been conducted. For example, in the free game instance of FIG. 20, the fourth column 714 is maintained at the maximum number of symbol positions. An advantage of this implementation is that there are at least the same number of ways to win in each of the free games. In this example, 4*4*4*7*4=1792 ways to win. FIG. 20 also shows that in the example, processor 204 uses different reel strip data in the free games which define reel strips that include multiplier symbols 2051,2052.

FIGS. 21 to 26 illustrate an alternative mechanism which results in the processor 204 awarding free games and show how the gaming device 200 can be operated so that a further bonus can be awarded from the free games.

Figure 21:
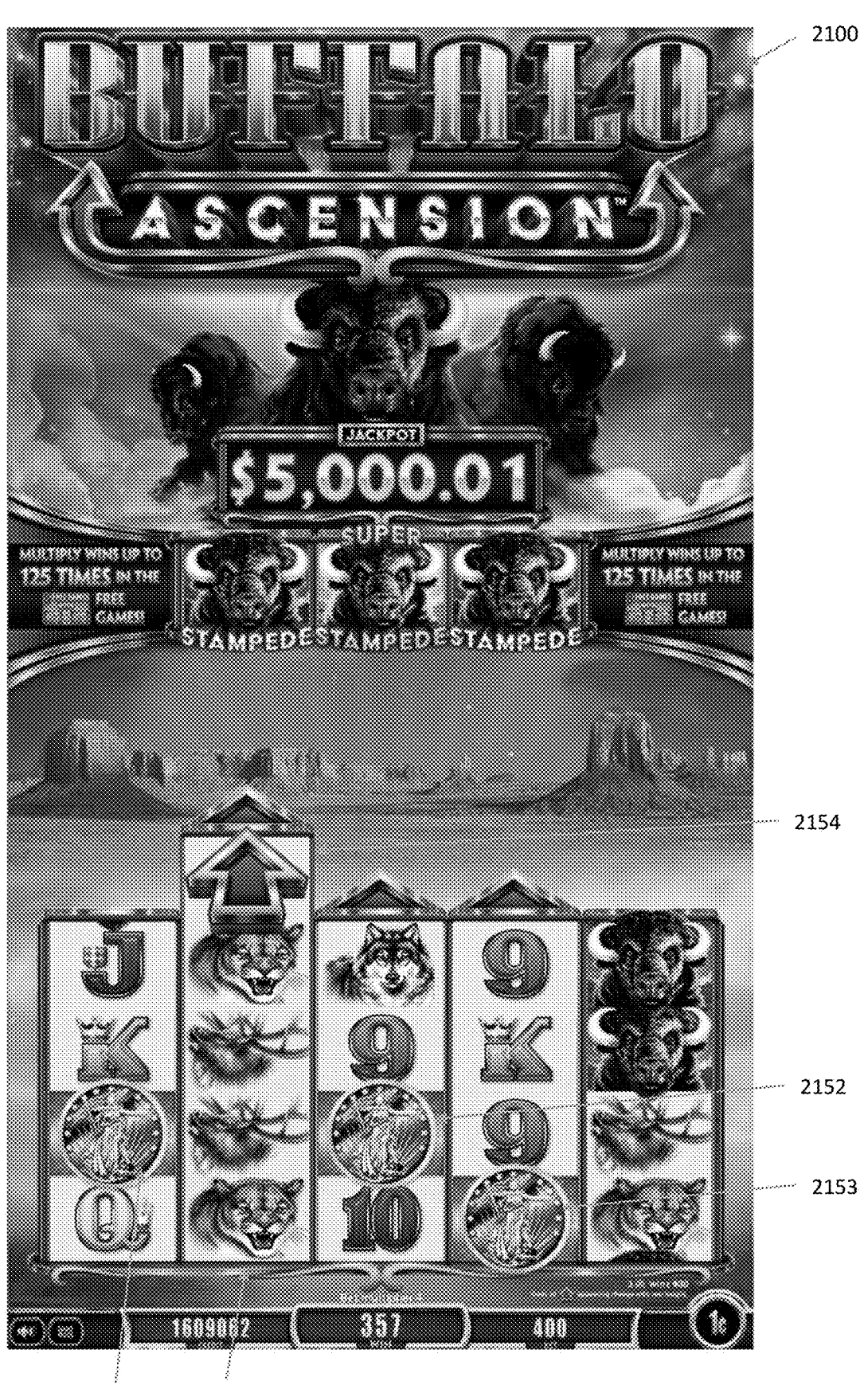
Figure 22:
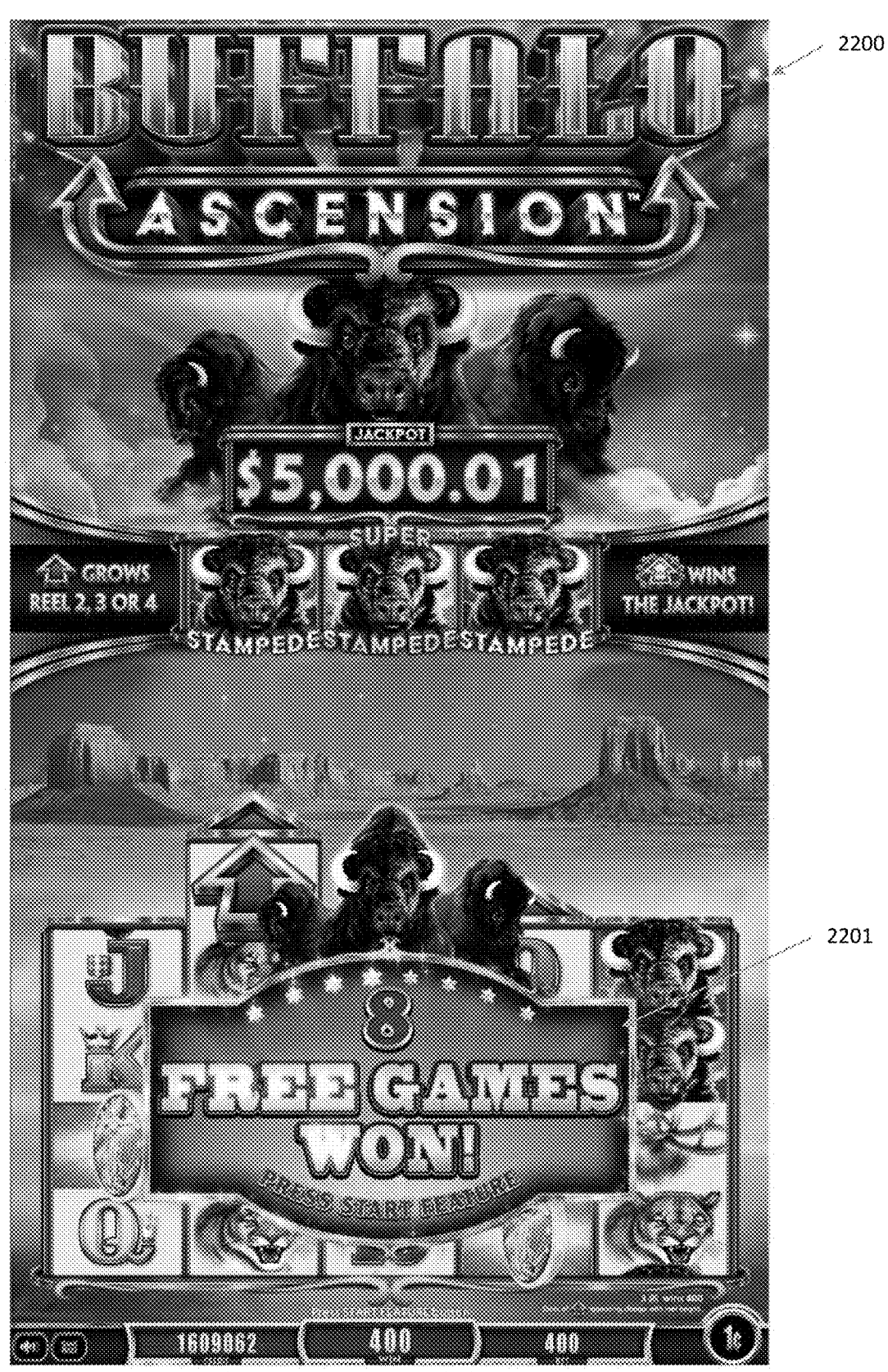

FIG. 21 is an example screen display 2100 after the symbol have been remapped at step 540 due to selection of Purple Arrow symbol 2154 in second column 712 at step 520. In the screen display 2100 of FIG. 21, the symbols selected by processor 204 at step 520 also include three scatter symbols 2151-2153. In this example, the evaluation of symbols by processor 204 at step 545 includes determining whether the selected symbols satisfy a trigger combination of symbols for awarding the free games; in this example, three or more scatter symbol such that the selected scatter symbols 2151-2153 satisfy this condition. Accordingly, in addition to making any award for winning combinations of symbols as part of the evaluation, processor 204 controls the display to display a message 2201 indicating the award of the free games as shown in screen display 2200 of FIG. 22.

Figure 23:
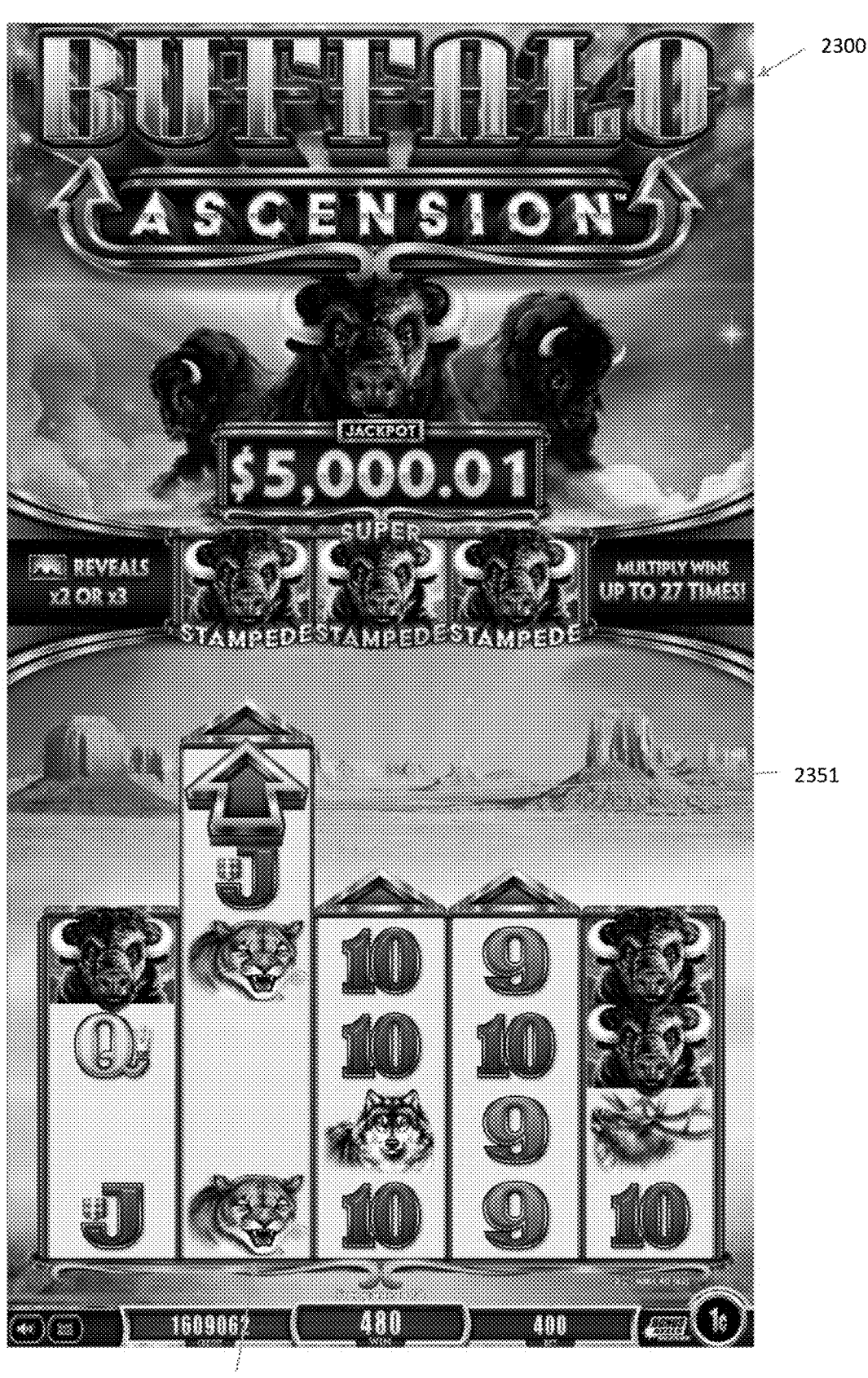

FIG. 23 is a screen display 2300 corresponding to a subsequent game instance of the series of free games where the symbols of the second column 712 have been remapped by processor 204 at step 540 in response to selection of the Purple Arrow symbol 2351. Screen display 2300 is another example of symbols "flashing" during the award of winning combinations of symbols.

Figure 24:
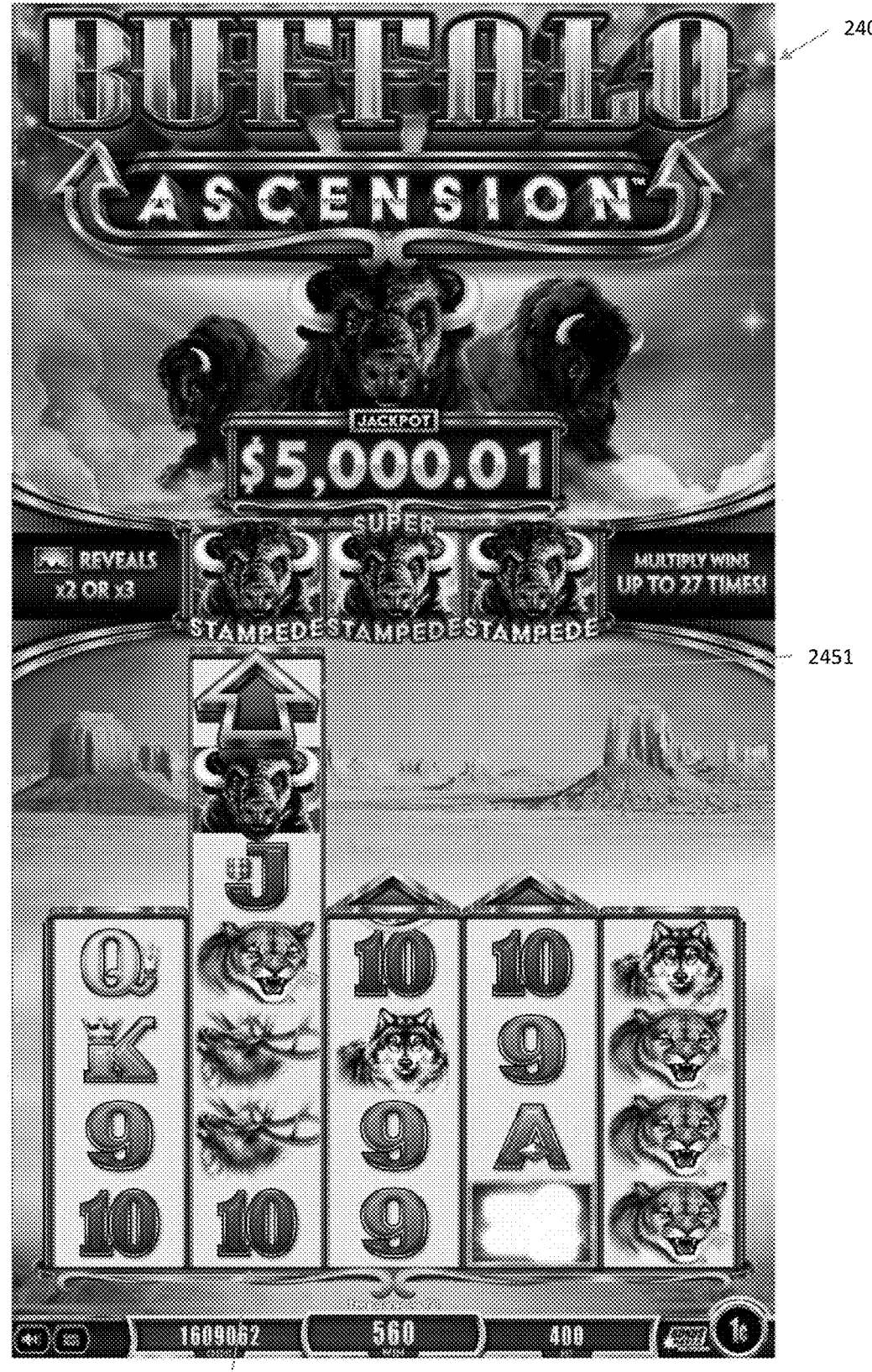

FIG. 24 is a screen display 2400 of a subsequent game instance of the series of free games where the second column 712 has reached the maximum number of symbol positions and Purple Arrow symbol 2451 has been selected for the top symbol display position which will result in the award by processor 204 at step 550 of the Stampede bonus as indicated by bonus indicator 2421.

Figure 25:

FIG. 25 is an example screen display 2500 featuring an animation on display 240 during the awarded Stampede bonus.

FIGS. 26 to 30 are screen displays showing an example of implementation of the "Super Stampede" symbol replacement bonus by operation of the gaming device.

Figure 26:
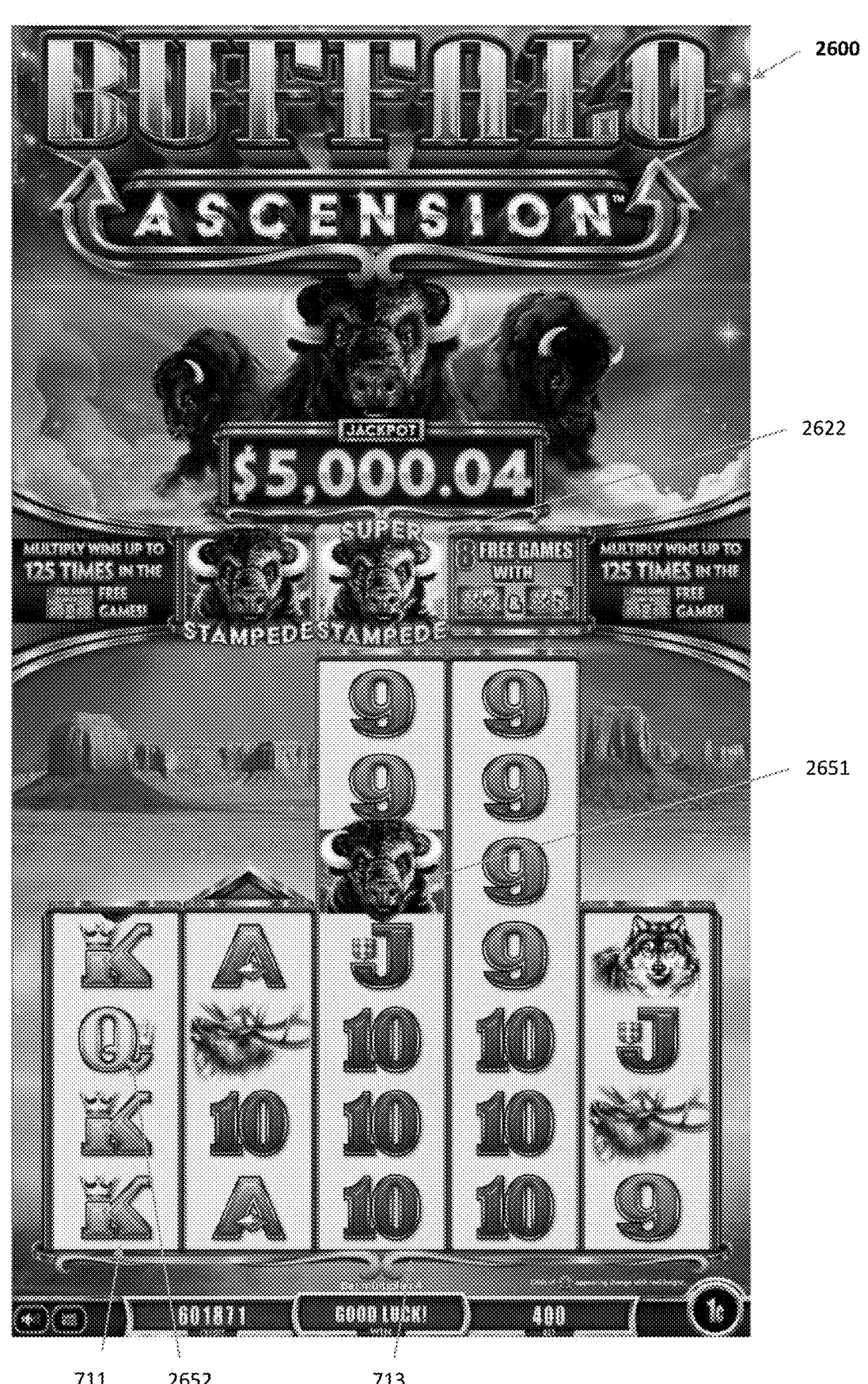

FIG. 26 is a screen display 2600 following award of the Super Stampede bonus at step 550. Super Stampede feature indicator 2622 has been highlighted as part of indicating the award. While not shown in FIG. 26, it will be understood that award of the Super Stampede bonus results from a Purple Arrow symbol being selected at one of the seven symbol positions of the fourth column. FIG. 26 shows the arrangement of symbol positions after the Purple Arrow symbol has been removed and the symbols have been remapped to the symbol positions of the third column 713. The selected symbols at the start of the Super Stampede replacement bonus include a single Buffalo/PIC1 symbol 2651 and there are no Buffalo/PIC1 symbol in first column, accordingly in a first iteration of replacing one or more symbols, processor 204 determines possible win amounts resulting from changing the symbols of the first column as part of assigning weightings at step 570.

Figure 27:
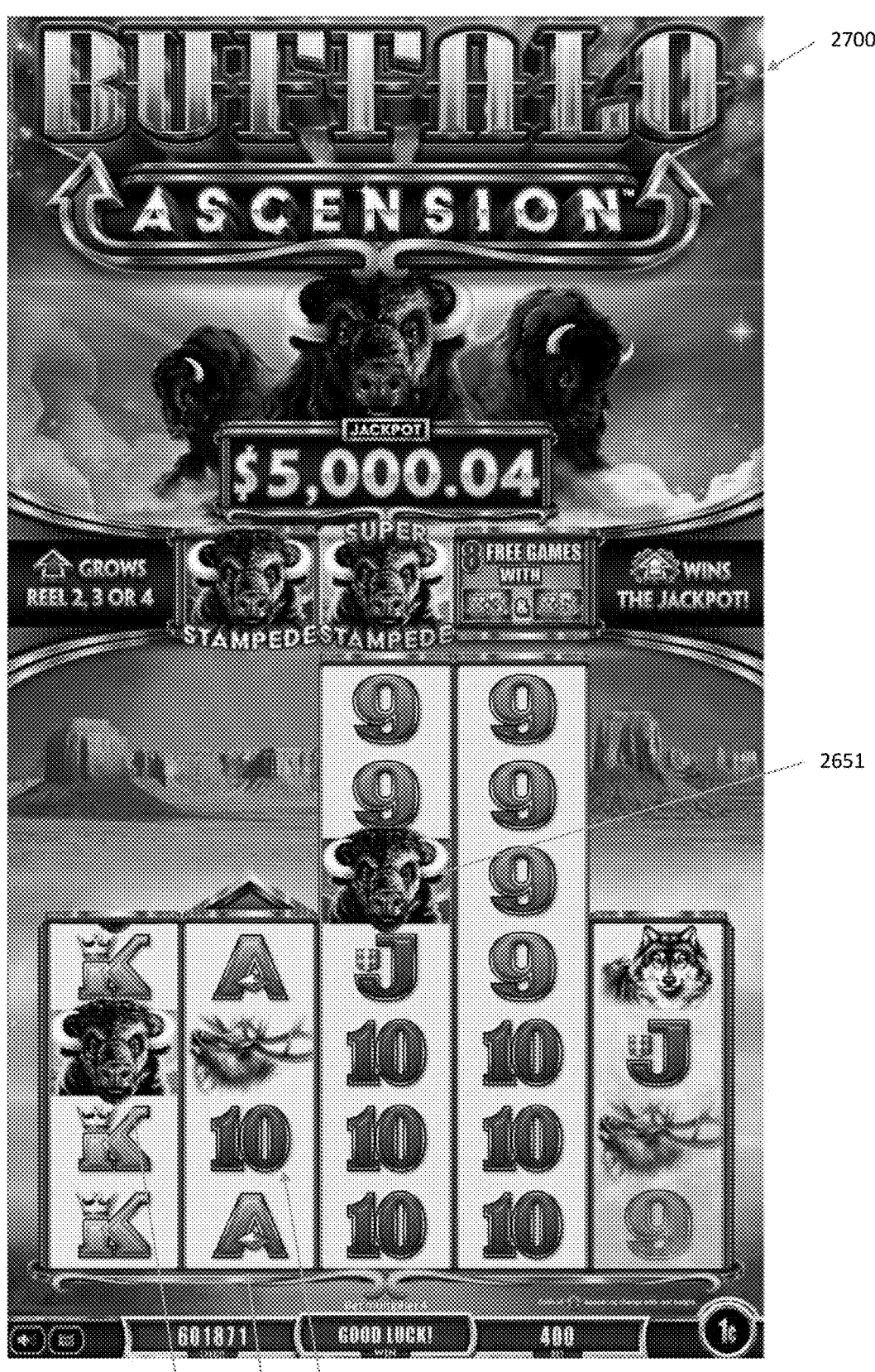

FIG. 27 shows an example screen display 2700 where the symbol selected at step 575 is the Queen symbol 2652 and it has been changed to a Buffalo/PIC1 symbol 2752. This symbol 2752 is displayed with a different coloured background to previously selected Buffalo/PIC1 2651 (yellow instead of purple) to indicate to the player that it has been changed by processor 204 as part of the Super Stampede bonus.

The symbol change of FIG. 27 is not sufficient to meet a prize condition at step 580 accordingly processor 204 proceeds to a second iteration of replacing symbols, in this case assigning weights to each symbol among the symbols of the second column 712 in order to select one of them because the change of the Queen symbol corresponds to no additional prize.

Figure 28:
Figure 29:
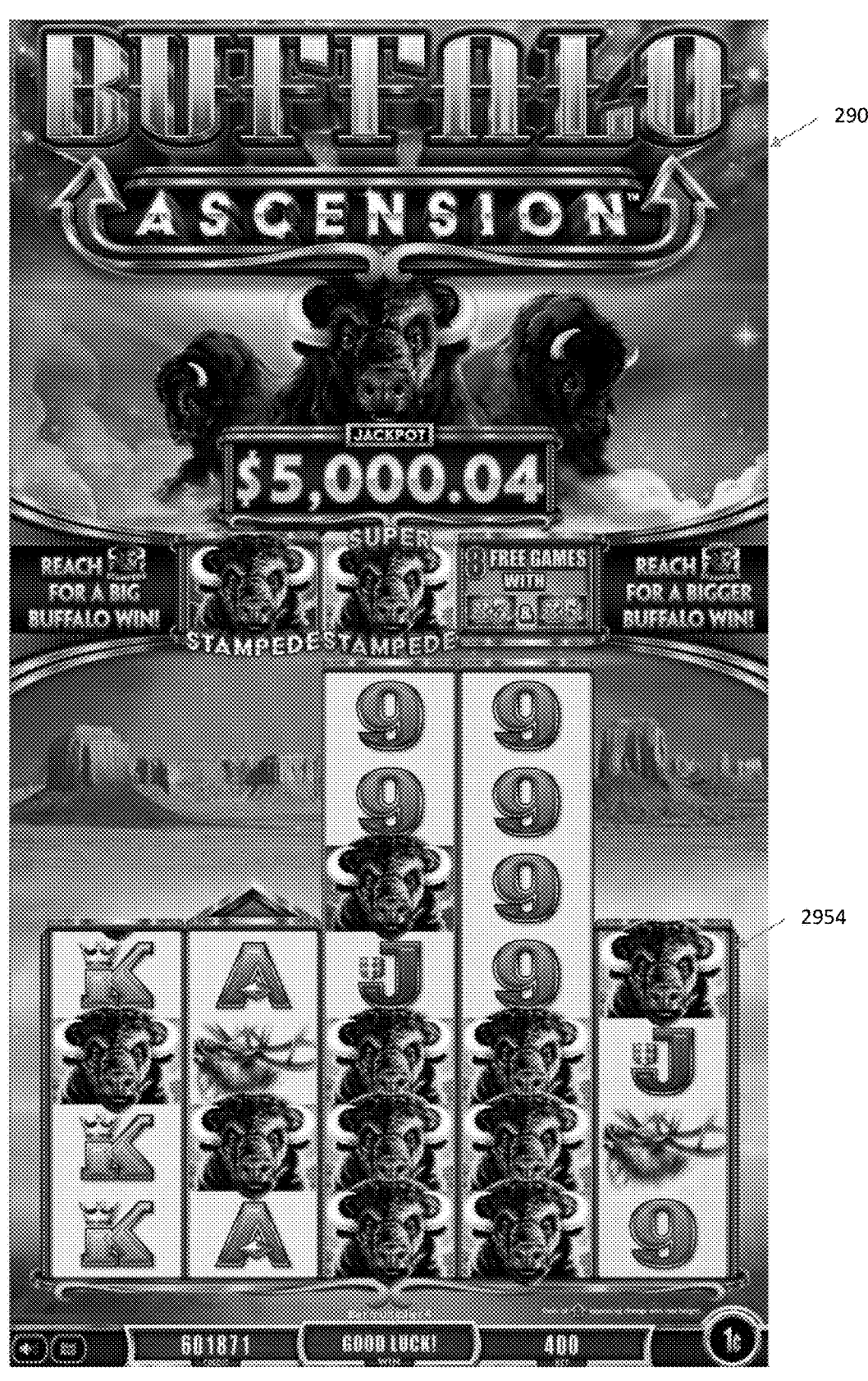
Figure 30:

In this example, in the second iteration processor 204 selects "10" symbol 2753 and changes this 10 symbol 2753 to Buffalo/PIC1 symbol 2853 together with all other instances of the 10 symbol as shown in FIG. 28.

In this example, as well as meeting a required minimum additional prize resulting from symbol replacement, the prize condition tested by processor 204 at step 580 comprises a replacement of a minimum number of symbols, in this example three symbols. Accordingly, processor 204 conducts a third iteration, this time selecting Wolf symbol 854 to be changed to Buffalo/PIC1 symbol 2954.

After this symbol replacement, processor 204 determines step 580 that the win condition is satisfied and processor 204 proceeds to symbol evaluation step 545 and determines the win amount from the displayed symbols. As part of the evaluation, the processor 204 controls the display 240 to display a screen display 3000 incorporating a win celebration animation.

In the example, more than one bonus can be awarded at the same time. In the case where more than one bonus is awarded concurrently, the symbol replacement iterations are controlled by end conditions to enable the symbol replacement to be carried out concurrently. For example, if two Stampede Feature Bonuses are won, then at least two symbols are replaced with Buffalo/PIC1 symbols. Similarly, if a Stampede Feature Bonus and a Super Stampede bonus are won concurrently, at least four symbols are replaced. In this example, the colour of the symbol background (here purple or yellow) can indicate which bonus feature cause the symbol to be replaced in order to indicate to the player where the changes came from.

More generally, if X Stampede Features are won and Y Super Stampede Features are won, then the processor 204 will change X symbols to PIC1 with a purple background and 3xY symbols to PIC1 with a yellow background. In these examples, one symbol will be changed at a time, before the next is changed (if there is a next). As well as the stampede animation described above, a sound is played when a symbol is changed.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:
   at least one processor; and
   at least one memory device with instructions stored thereon which, when executed by the at least one processor, cause the at least one processor to:
   for an initial play in a gaming instance of an electronic game, determine a symbol position state of a plurality of symbol position states stored in the at least one memory device, wherein each symbol position state corresponds to a number of symbol positions in at least one column of a plurality of columns;
   receive a random number generator (RNG) output from an RNG;
   based upon the RNG output, control and cause display of a plurality of symbols at the number of symbol positions;
   determine and control and cause display of at least one modifier symbol landing in at least one initial landing symbol position of the at least one column of the plurality of columns for the initial play;
   based upon the at least one landed modifier symbol, determine a different symbol position state of the plurality of symbol position states for a next play in the same gaming instance of the electronic game, wherein the different symbol position state comprises at least one more symbol position than the number of symbol positions; and
   based at least upon the determined different symbol position state of the plurality of symbol position states for the next play, control and cause display, for the next play, of a remapped set of the plurality of symbols in each column of the plurality of columns corresponding to a landed at least one modifier symbol from the initial play, including, for each column including the remapped set of the plurality of symbols for the next play, controlling and causing display of (i) each at least one landed modifier symbol from the initial play at a corresponding at least one more symbol position, (ii) a prior determined symbol from the initial play in a corresponding at least one initial landing symbol position from the initial play, each prior determined symbol having been displayed in a symbol position above a corresponding at least one initial landing symbol in the initial play, and (iii) a newly determined symbol in each symbol position that was occupied by a corresponding prior determined symbol in the initial play.

2. The electronic gaming device of claim 1, wherein the instructions further cause the at least one processor to, based upon the at least one modifier symbol, cause display of an animation in at least one column of the plurality of columns indicating that the at least one column will include the at least one more symbol position in the next play of the electronic game.

3. The electronic gaming device of claim 1, wherein the instructions further cause the at least one processor to:
   based upon the RNG output, determine the plurality of symbols; and
   control and cause display of the plurality of symbols at the number of symbol positions by stopping each reel strip of a plurality of reel strips at a respective stop position.

4. The electronic gaming device of claim 1, wherein the instructions further cause the at least one processor to, based upon a trigger condition being detected, reset the symbol position state to a base symbol position state including a base number of symbol positions for the electronic game.

5. The electronic gaming device of claim 1, wherein the instructions further cause the at least one processor to determine the symbol position state based upon an input selected at the electronic gaming device, wherein each input of a plurality of inputs is associated with a respective symbol position state.

6. The electronic gaming device of claim 5, wherein the instructions further cause the at least one processor to:
   cause display of at least one input of the plurality of inputs; and
   cause display of a representation of each respective symbol position state for the at least one input to communicate the respective symbol position state for the at least one input.

7. The electronic gaming device of claim 1, wherein the instructions further cause the at least one processor to:
   based upon the different symbol position state, determine that a bonus trigger condition is satisfied; and
   based upon the bonus trigger condition being satisfied, control and cause display of a bonus associated with the bonus trigger condition, wherein the bonus comprises at least one of i) a number of free spins or ii) a bonus amount.

8. An electronic gaming system comprising:
   at least one processor; and
   at least one memory device with instructions stored thereon that, in response to execution by the at least one processor, cause the at least one processor to:
   for an initial play in a gaming instance of an electronic game, identify a symbol position state of a plurality of symbol position states stored in the at least one memory device, wherein each symbol position state is associated with a number of symbol positions in at least one column of a plurality of columns;
   prompt a random number generator (RNG) output from an RNG;

in response to the RNG output, identify and control and cause display of a plurality of symbols for the number of symbol positions;

determine and control and cause display of at least one modifier symbol landing in at least one initial landing symbol position of the at least one column of the plurality of columns for the initial play;

in response to determining that the plurality of symbols includes the at least one modifier symbol, identify a different symbol position state of the plurality of symbol position states for a next play in the same gaming instance of the electronic game, wherein the different symbol position state comprises at least one additional symbol position than the number of symbol positions associated with the symbol position state; and based at least upon the identified different symbol position state of the plurality of symbol position states for the next play, control and cause display, for the next play, of a remapped set of the plurality of symbols in each column of the plurality of columns corresponding to a landed at least one modifier symbol from the initial play, including, for each column including the remapped set of the plurality of symbols for the next play, controlling and causing display of (i) each at least one landed modifier symbol from the initial play at a corresponding at least one more symbol position, (ii) a prior determined symbol from the initial play in a corresponding at least one initial landing symbol position from the initial play, each prior determined symbol having been displayed in a symbol position above a corresponding at least one initial landing symbol in the initial play, and (iii) a newly determined symbol in each symbol position that was occupied by a corresponding prior determined symbol in the initial play.

9. The electronic gaming system of claim 8, wherein the instructions further cause the at least one processor to, based upon the at least one modifier symbol, identify an animation for at least one column of the plurality of columns indicating that the at least one column will include the at least one additional symbol position in the next play of the electronic game.

10. The electronic gaming system of claim 8, wherein the instructions further cause the at least one processor to:

in response to the RNG output, determine the plurality of symbols;

identify the plurality of symbols at the number of symbol positions; and in response to identifying the plurality of symbols, identify a respective stop position for each reel strip of a plurality of reel strips.

11. The electronic gaming system of claim 8, wherein the instructions further cause the at least one processor to, in response to a trigger condition being detected, reset the symbol position state to a base symbol position state including a base number of symbol positions for the electronic game.

12. The electronic gaming system of claim 8, wherein the instructions further cause the at least one processor to determine the symbol position state based upon a selected input, wherein each input of a plurality of inputs corresponds to a respective symbol position state.

13. The electronic gaming system of claim 12, wherein the instructions further cause the at least one processor to:

identify at least one input of the plurality of inputs available for the electronic game; and identify a representation of each respective symbol position state for the at least one input to communicate the respective symbol position state for the at least one input.

14. The electronic gaming system of claim 8, wherein the instructions further cause the at least one processor to:

in response to identifying the different symbol position state, determine that a bonus trigger condition is satisfied; and in response to the bonus trigger condition being satisfied, control and cause display of a bonus associated with the bonus trigger condition, wherein the bonus comprises at least one of i) a number of free spins or ii) a bonus amount.

15. A non-transitory computer-readable storage medium with instructions stored thereon that, in response to execution by at least one processor, cause the at least one processor to:

for an initial play in a gaming instance of an electronic game, select a symbol position state of a plurality of symbol position states, wherein each symbol position state is associated with a number of symbol positions in at least one column of a plurality of columns;

receive a random number generator (RNG) output from an RNG;

in response to the RNG output, select and control and cause display of a plurality of symbols at the number of symbol positions;

determine and control and cause display of at least one modifier symbol landing in at least one initial landing symbol position of the at least one column of the plurality of columns for the initial play;

in response to determining that the plurality of symbols includes the at least one landed modifier symbol, select a different symbol position state of the plurality of symbol position states for a next play in the same gaming instance of the electronic game, wherein the different symbol position state comprises at least one additional symbol position than the number of symbol positions associated with the symbol position state; and based at least upon the selected different symbol position state of the plurality of symbol position states for the next play, control and cause display, for the next play, of a remapped set of the plurality of symbols in each column of the plurality of columns corresponding to a landed at least one modifier symbol from the initial play, including, for each column including the remapped set of the plurality of symbols for the next play, controlling and causing display of (i) each at least one landed modifier symbol from the initial play at a corresponding at least one more symbol position, (ii) a prior determined symbol from the initial play in a corresponding at least one initial landing symbol position from the initial play, each prior determined symbol having been displayed in a symbol position above a corresponding at least one initial landing symbol in the initial play, and (iii) a newly determined symbol in each symbol position that was occupied by a corresponding prior determined symbol in the initial play.

16. The non-transitory computer-readable storage medium of claim 15, wherein the instructions further cause the at least one processor to, in response to determining that the plurality of symbols includes the at least one modifier symbol, select an animation for at least one column of the plurality of columns indicating that the at least one column will include the at least one additional symbol position in the next play of the electronic game.

17. The non-transitory computer-readable storage medium of claim 15, wherein the instructions further cause the at least one processor to:

in response to the RNG output, select the plurality of symbols; and in response to selecting the plurality of symbols, select a respective stop position for each reel strip of a plurality of reel strips.

18. The non-transitory computer-readable storage medium of claim 15, wherein the instructions further cause the at least one processor to, in response to detecting a trigger condition, reset the symbol position state to a base symbol position state including a base number of symbol positions for the electronic game.

19. The non-transitory computer-readable storage medium of claim 15, wherein the instructions further cause the at least one processor to select the symbol position state based upon a selected input, wherein each input of a plurality of inputs available for the electronic game corresponds to a respective symbol position state.

20. The non-transitory computer-readable storage medium of claim 15, wherein the instructions further cause the at least one processor to:

in response to identifying the different symbol position state, determine that a bonus trigger condition is satisfied; and in response to the bonus trigger condition being satisfied, determine a bonus associated with the bonus trigger condition, wherein the bonus comprises at least one of i) a number of free spins or ii) a bonus amount.

\*   \*   \*   \*   \*